United States Patent
Han et al.

(10) Patent No.: US 11,665,577 B2
(45) Date of Patent: May 30, 2023

(54) COMMUNICATION METHOD AND APPARATUS

(71) Applicant: HONOR DEVICE CO., LTD., Guangdong (CN)

(72) Inventors: Feng Han, Shanghai (CN); Yinghao Jin, Shanghai (CN); Wei Tan, Shanghai (CN); Wenqi Sun, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/039,489

(22) Filed: Sep. 30, 2020

(65) Prior Publication Data

US 2021/0014722 A1    Jan. 14, 2021

Related U.S. Application Data

(63) Continuation of application No. PCT/CN2018/096589, filed on Jul. 23, 2018.

(30) Foreign Application Priority Data

Apr. 4, 2018    (CN) .......................... 201810299596.8

(51) Int. Cl.
*H04W 28/02*  (2009.01)
*H04L 1/00*   (2006.01)

(52) U.S. Cl.
CPC ....... *H04W 28/0268* (2013.01); *H04L 1/0017* (2013.01); *H04W 28/0263* (2013.01)

(58) Field of Classification Search
CPC ......... H04W 28/0268; H04W 28/0263; H04W 28/24; H04W 28/02; H04W 28/0215;

(Continued)

(56) References Cited

U.S. PATENT DOCUMENTS

| 10,257,868 B2 | 4/2019 | Wang et al. |
| 2014/0241275 A1 | 8/2014 | Edara et al. |

(Continued)

FOREIGN PATENT DOCUMENTS

| CN | 104137605 A | 11/2014 |
| CN | 104363598 A | 2/2015 |

(Continued)

OTHER PUBLICATIONS

3GPP TR 38.806 V15.0.0 (Dec. 2017), "3rd Generation Partnership Project;Technical Specification Group Radio Access Network;Study of separation of NR Control Plane (CP) and User Plane(UP) for split option 2;(Release 15)," Dec. 2017, 22 pages.

(Continued)

*Primary Examiner* — Sudesh M Patidar
(74) *Attorney, Agent, or Firm* — Fish & Richardson P.C.

(57) ABSTRACT

This application provides communication methods and apparatuses. One method comprises: obtaining, by a central unit-user plane node (CU-UP), first information that instructs the CU-UP to map a first data packet to a data radio bearer (DRB) and set a reflective mapping indication field of the first data packet, wherein the first data packet belongs to a quality of service (QoS) flow, and the reflective mapping indication field instructs a terminal device to map an uplink data packet in the QoS flow to the DRB; receiving, by the CU-UP, the first data packet sent by a core network device; setting, by the CU-UP, the reflective mapping indication field of the first data packet; and sending, by the CU-UP to the terminal device on the DRB, the first data packet.

26 Claims, 15 Drawing Sheets

(58) Field of Classification Search
CPC ......... H04W 28/0231; H04W 28/0236; H04W 28/16; H04W 28/0247; H04W 28/0252; H04W 28/0257; H04W 28/10; H04W 28/12; H04W 72/1263; H04W 72/1268; H04W 72/1289; H04W 76/15; H04W 76/27; H04W 80/08; H04W 88/08; H04W 88/085; H04W 88/12; H04L 47/365; H04L 47/10; H04L 47/22; H04L 47/24; H04L 47/2441; H04L 47/2491; H04L 47/25; H04L 47/41; H04L 47/621; H04L 47/6215; H04L 47/6295; H04L 1/0017; H04L 1/1607; H04L 5/0053

See application file for complete search history.

(56) References Cited

U.S. PATENT DOCUMENTS

| | | | |
|---|---|---|---|
| 2018/0054237 A1 | 2/2018 | Tseng et al. | |
| 2018/0324631 A1* | 11/2018 | Jheng | H04W 28/0268 |
| 2019/0075482 A1* | 3/2019 | Eriksson | H04W 76/27 |
| 2019/0150023 A1* | 5/2019 | Cho | H04W 28/0263 370/235 |
| 2019/0182211 A1* | 6/2019 | Yang | H04L 61/2592 |
| 2019/0357086 A1* | 11/2019 | Palat | H04L 47/24 |
| 2020/0100134 A1* | 3/2020 | Tang | H04W 28/16 |
| 2020/0169913 A1* | 5/2020 | Byun | H04W 80/08 |
| 2020/0178109 A1* | 6/2020 | Fang | H04W 12/06 |
| 2020/0374948 A1* | 11/2020 | Pan | H04W 28/12 |
| 2020/0382240 A1* | 12/2020 | Centonza | H04W 76/11 |
| 2021/0037425 A1* | 2/2021 | Kainulainen | H04W 76/27 |

FOREIGN PATENT DOCUMENTS

| | | | | |
|---|---|---|---|---|
| CN | 104796948 A | | 7/2015 | |
| CN | 106571901 A | | 4/2017 | |
| CN | 107302777 A | | 10/2017 | |
| CN | 107426776 A | | 12/2017 | |
| CN | 108811153 A | | 11/2018 | |
| KR | 102355678 | * | 5/2017 | |
| RU | 2628207 C2 | | 8/2017 | |
| WO | 2014075265 A1 | | 5/2014 | |
| WO | 2016184348 A1 | | 11/2016 | |
| WO | 2017010693 A1 | | 1/2017 | |
| WO | WO2018201734 | * | 12/2017 | |
| WO | 2018026169 A1 | | 2/2018 | |
| WO | WO-2019061787 A1 | * | 4/2019 | H04W 28/24 |

OTHER PUBLICATIONS

3GPP TS 23.501 V15.1.0 (Mar. 2018), "3rd Generation Partnership Project;Technical Specification Group Services and System Aspects;System Architecture for the 5G System;Stage 2(Release 15)," Mar. 2018, 201 pages.
3GPP TS 36.314 V15.0.0 (Mar. 2018), "3rd Generation Partnership Project;Technical Specification Group Radio Access Network;Evolved Universal Terrestrial Radio Access (E-UTRA);Layer 2—Measurements(Release 15)," Mar. 2018, 26 pages.
3GPP TS 38.331 V15.1.0 (Mar. 2018), "3rd Generation Partnership Project;Technical Specification Group Radio Access Network; NR;Radio Resource Control (RRC) protocol specification(Release 15)," Mar. 2018, 268 pages.
3GPP TS 38.401 V15.0.0 (Dec. 2017), "3rd Generation Partnership Project;Technical Specification Group Radio Access Network;NG-RAN;Architecture description(Release 15)," Dec. 2017, 23 pages.
3GPP TS 38.463 V0.1.0 (Mar. 2018);3rd Generation Partnership Project;Technical Specification Group Radio Access Network; NG-RAN;E1 application protocol (E1AP)(Release 15);total 15 pages.
Ericsson, "SDAP Header Format," 3GPP TSG-RAN WG2 #100 Tdoc, R2-1712923, Reno, Nevada, USA, Oct. 27-Dec. 1, 2017, 3 pages.
LG Electronics Inc., "Discussion on DRB modification procedure," 3GPP TSG-RAN WG3 #99, R3-181071, Athens, Greece, Feb. 26-Mar. 2, 2018, 4 pages.
Office Action issued in Chinese Application No. 201811045799.0 dated Jul. 1, 2019, 10 pages.
Office Action issued in Chinese Application No. 201811045799.0 dated Nov. 12, 2019, 6 pages (with English translation).
Search Report issued in Chinese Application No. 201811045799.0 dated Nov. 2, 2018, 7 pages.
PCT International Search Report and Written Opinion issued in International Application No. PCT/CN2018/096589 dated Jan. 4, 2019, 13 pages (with English translation).
ZTE, "Reflective QoS impact on E1 interface," 3GPP TSG-RAN WG3 #98, R3-174413, Reno, NV, USA, Nov. 27-Dec. 1, 2017, 4 pages.
Huawei, "UE context management function over E1 interface," 3GPP TSG-RAN WG3 NR#99, R3-181134, Athens, Greece, Feb. 26-Mar. 2, 2018, 3 pages.
Ericsson, "E1 functions," 3GPP TSG RAN WG3 Meeting #98, Tdoc R3-174996, Reno, Nevada, USA, Nov. 27-Dec. 1, 2017, 2 pages.
Extended European Search Report issued in European Application No. 18913408.3 dated Apr. 12, 2021, 12 pages.
3GPP TS 37.324 V1.2.0 (Mar. 2018), "3rd Generation Partnership Project, Technical Specification Group Radio Access Network, E-UTRA and NR, Service Data Adaptation Protocol (SDAP) Specification (Release 15)," Mar. 2018, 11 pages.
CATT, "Discussion on F1-U UL GTP TEID allocation," 3GPP TSG-RAN WG3-#99, R3-180833, Athens, Greece, Feb. 26-Mar. 2, 2018, 3 pages.
Ericsson, "Bearer Context procedure," 3GPP TSG-RAN WG3 #99, R3-181428, Athens, Greece, Feb. 26-Mar. 2, 2018, 4 pages.
Ericsson, "Bearer Setup Request—analysis of NG-RAN parameters," 3GPP TSG-RAN WG3 #99, R3-181305, Athens, Greece, Feb. 26-Mar. 2, 2018, 3 pages.
Nokia, Nokia Shanghai Bell, "Discussion on E1 overall procedures," 3GPP TSG-RAN WG3#99, R3-181040, Athens, Greece, Feb. 26-Mar. 2, 2018, 2 pages.
Nokia, Nokia Shanghai Bell, "E1 UE associated functions," 3GPP TSG-RAN WG3#99, R3-181042, Athens, Greece, Feb. 26-Mar. 2, 2018, 2 pages.
Samsung, "On the SDAP indicator for the reflective QoS AS and NAS operation," 3GPP TSG SA WG2 #123, S2-177440, Ljubljana, Slovenia, Oct. 23-27, 2017, 4 pages.

* cited by examiner

COMMUNICATION METHOD AND APPARATUS

CROSS-REFERENCE TO RELATED APPLICATIONS

This application is a continuation of International Application No. PCT/CN2018/096589, filed on Jul. 23, 2018, which claims priority to Chinese Patent Application No. 201810299596.8, filed on Apr. 4, 2018. The disclosures of the aforementioned applications are hereby incorporated by reference in their entireties.

TECHNICAL FIELD

This application relates to the communications field, and more specifically, to a communication method and apparatus.

BACKGROUND

As next-generation communications systems are fully and further studied, the industry has reached a basic consensus about specific content for studies on the 5th mobile communications technology (5G). 5G supports various types of network deployment and various application types, including higher-rate experience and higher-bandwidth access capabilities, lower-latency and high-reliability information exchange, and access and management of larger quantities of low-cost machine type communication devices. To meet these requirements, 5G has defined a network architecture that is based on quality of service flows (QoS flow), and defined a packet transmission mechanism on an air interface based on data radio bearers (DRB). For a protocol data unit (PDU) session of a terminal device, data packets in one QoS flow are carried on one DRB for transmission, and data packets in one or more QoS flows carried on one DRB have a same transmission characteristic, for example, a same scheduling policy, a same queuing management policy, or a same rate matching policy. That is, there is a mapping relationship from QoS flows to DRBs. The mapping relationship may be as follows: One DRB is corresponding to one or more QoS flows, and uplink data packets and downlink data packets in one QoS flow may be carried on one DRB, or may be separately carried on different DRBs. Based on the mapping relationship, different QoS flows are mapped to corresponding DRBs for transmission. In addition, an access network device usually performs layer 2 (L2) parameter measurement, in order to support air interface resource operations, radio resource management, network operation and maintenance, minimization of drive tests (MDT) and self-organizing network (SON) requirements, and the like. For example, the access network device measures related parameters at, for example, a Packet Data Convergence Protocol (PDCP) layer, a Radio Link Control (RLC) layer, and a Medium Access Control (MAC) layer.

In the New Radio (NR) technology, an access network device (for example, a base station) may include a central unit (CU) and a distributed unit (DU). That is, functions of a base station in an access network are split. Some functions of the base station are deployed on one CU, the remaining functions are deployed on one or more DUs, and the CU controls the one or more DUs, so as to reduce costs and facilitate ease of network expansion. Further, at the CU part, the CU is divided into a central unit-control plane (CU-CP) node and a central unit-user plane (CU-UP) node. The CU-UP and the CU-CP may be on different physical devices. An open interface exists between the CU-CP and the CU-UP. In this new access network device architecture, how to effectively implement QoS flow management, that is, how to implement QoS flow to DRB mapping and how to support L2 parameter measurement, becomes an urgent challenge that needs to be addressed currently.

SUMMARY

This application provides a communication method and apparatus, so that QoS flow to DRB mapping can be implemented and L2 parameter measurement can be supported in a CU-DU separate base station architecture. Therefore, successful and normal transmission of user data can be ensured, network stability is improved, quality of network operation is improved, and user experience is improved.

According to a first aspect, a communication method is provided, including: obtaining, by a central unit-user plane node CU-UP, first information, where the first information is used to instruct the CU-UP to map a first data packet to a first data radio bearer DRB and set a reflective mapping indication field of the first data packet, and a quality of service flow QoS flow that the first data packet belongs to is a first QoS flow; receiving, by the CU-UP, the first data packet sent by a core network device; setting, by the CU-UP, the reflective mapping indication field of the first data packet; and sending, by the CU-UP to a terminal device on the first DRB, the first data packet whose mapping field is set.

In the communication method provided in the first aspect, in a CU-DU separate base station structure, when the CU-UP determines that reflective mapping from the first QoS flow to the first DRB is required, the CU-UP obtains the first information. The first information is used to instruct the CU-UP to map the first data packet to the first DRB and set the reflective mapping indication field of the first data packet. After receiving the first data packet sent by the core network, the CU-UP sets the reflective mapping indication field of the first data packet, and sends, to the terminal device on the first DRB, the first data packet whose reflective mapping indication field is set. In this way, the first QoS flow is mapped to the first DRB in a CU-DU separate scenario, so that the first QoS flow is mapped to the first DRB for both the CU-UP and the terminal device. This ensures that the terminal device and the CU-UP can correctly transmit data, improves communication efficiency and stability, and improves user experience.

In a possible implementation of the first aspect, obtaining, by a CU-UP, first information includes: receiving, by the CU-UP, the first information sent by a central unit-control plane node CU-CP.

In a possible implementation of the first aspect, setting, by the CU-UP, the reflective mapping indication field of the first data packet includes: setting, by the CU-UP, a bit of the reflective mapping indication field of the first data packet to 1.

In a possible implementation of the first aspect, setting, by the CU-UP, the reflective mapping indication field of the first data packet includes: setting, by the CU-UP, a bit of the reflective mapping indication field of the first data packet to 0.

In a possible implementation of the first aspect, the first information is information indicating reflective mapping from the first QoS flow to the first DRB.

In a possible implementation of the first aspect, the method further includes: receiving, by the CU-UP, a second data packet sent by the terminal device on the first DRB, where a QoS flow that the second data packet belongs to is the first QoS flow; and setting, by the CU-UP, the bit of the reflective mapping indication field of the first data packet to 0 based on the second data packet.

In a possible implementation of the first aspect, receiving, by the CU-UP, the first information sent by a CU-CP includes: receiving, by the CU-UP, a bearer context setup request sent by the CU-CP, where the bearer context setup request includes the first information.

In a possible implementation of the first aspect, receiving, by the CU-UP, the first information sent by a CU-CP includes: receiving, by the CU-UP, a bearer modification request sent by the CU-CP, where the bearer modification request includes the first information.

In a possible implementation of the first aspect, the method further includes: sending, by the CU-UP, second information to the CU-CP, where the second information is used to indicate that reflective mapping from the first QoS flow to the first DRB is successful.

According to a second aspect, a communication method is provided, including: generating, by a central unit-control plane node CU-CP, first information, where the first information is used to instruct a central unit-user plane node CU-UP to map a first data packet to a first data radio bearer DRB and set a reflective mapping indication field of the first data packet, and a quality of service flow QoS flow that the first data packet belongs to is a first QoS flow; and sending, by the CU-CP, the first information to the CU-UP.

In the communication method provided in the second aspect, in a CU-DU separate base station architecture, when the CU-CP requires performing mapping from the first QoS flow to the first DRB, the CU-CP sends the first information to the CU-UP. The first information is used to instruct the CU-UP to map the first data packet to the first DRB and set the reflective mapping indication field of the first data packet. After setting, based on the first information, the reflective mapping indication field of the first data packet received from a core network, the CU-UP sends, to a terminal device on the first DRB, the first data packet whose reflective mapping indication field is set. In this way, the first QoS flow is mapped to the first DRB in a CU-DU separate scenario, so that QoS flow to DRB mapping is implemented for both the CU-UP and the terminal device. This ensures that the terminal device and the CU-UP can correctly transmit data, improves communication efficiency and stability, and improves user experience.

In a possible implementation of the second aspect, the first information is information indicating reflective mapping from the first QoS flow to the first DRB.

In a possible implementation of the second aspect, sending, by the CU-CP, the first information to the CU-UP includes: sending, by the CU-CP, a bearer context setup request to the CU-UP, where the bearer context setup request includes the first information.

In a possible implementation of the second aspect, sending, by the CU-CP, the first information to the CU-UP includes: sending, by the CU-CP, a bearer modification request to the CU-UP, where the bearer modification request includes the first information.

In a possible implementation of the second aspect, the method further includes: receiving, by the CU-CP, second information sent by the CU-UP, where the second information is used to indicate that reflective mapping from the first QoS flow to the first DRB is successful.

According to a third aspect, a communication method is provided, including: receiving, by a central unit—user plane node CU-UP, third information sent by a central unit—control plane node CU-CP, where the third information is used to instruct the CU-UP to detect transmission performance of a first data packet, and the first data packet is identified by a first quality of service flow identifier QFI or a first 5G quality of service identifier 5QI; and detecting, by the CU-UP, the transmission performance of the first data packet based on the third information.

In the communication method provided in the third aspect, in a CU-DU separate base station architecture, when the CU-CP requires detection of performance of a first QoS flow in a PDU session of a terminal device, the CU-CP sends the third information to the CU-UP. The third information is used to instruct the CU-UP to detect the transmission performance of the first data packet, and the first data packet is identified by the first quality of service flow identifier QFI or the first 5G quality of service identifier 5QI. The CU-UP detects the transmission performance of the first data packet based on the third information. In this way, transmission parameters are measured at a granularity of a 5QI or a QFI in the CU-DU separate base station architecture, so that normal running of a network system can be ensured, and user experience can be improved.

In a possible implementation of the third aspect, the method further includes: sending, by the CU-UP, fourth information to the CU-CP, where the fourth information is used to indicate whether the transmission performance of the first data packet fulfills a transmission performance indicator, the transmission performance indicator is configured in the first data packet, and the third information includes the transmission performance indicator.

In a possible implementation of the third aspect, the sending, by the CU-UP, fourth information to the CU-CP includes: sending, by the CU-UP, notification information to the CU-CP, where the notification information includes the fourth information.

In a possible implementation of the third aspect, sending, by the CU-UP, fourth information to the CU-CP includes: sending, by the CU-UP, a bearer modification request to the CU-CP, where the bearer modification request includes the fourth information.

In a possible implementation of the third aspect, the transmission performance indicator of the first data packet includes at least one of a delay budget of the first data packet, a packet loss rate of the first data packet, an uplink guaranteed bit rate GBR, a downlink GBR, a maximum uplink GBR, or a maximum downlink GBR.

In a possible implementation of the third aspect, the third information includes measurement configuration information, where the measurement configuration information includes a transmission performance parameter and/or a measurement time length of the first data packet; and the method further includes: sending, by the CU-UP, fifth information to the CU-CP, where the fifth information includes a detection result of the transmission performance of the first data packet.

In a possible implementation of the third aspect, the transmission performance parameter includes at least one of a packet loss rate of the first data packet, a downlink transmission delay of the first data packet, a scheduled Internet Protocol throughput of the first data packet, or a data volume of the first data packet.

According to a fourth aspect, a communication method is provided, including: generating, by a central unit—control plane node CU-CP, third information, where the third information is used to instruct a central unit—user plane node CU-UP to detect transmission performance of a first data packet, and the first data packet is identified by a first quality of service flow identifier QFI or a first 5G quality of service identifier 5QI; and sending, by the CU-CP, the third information to the CU-UP.

In the communication method provided in the fourth aspect, in a CU-DU separate base station architecture, when the CU-CP requires detection of performance of a first QoS flow in a PDU session of a terminal device, the CU-CP sends the third information to the CU-UP. The third information is used to instruct the CU-UP to detect the transmission performance of the first data packet, and the first data packet is identified by the first quality of service flow identifier QFI or the first 5G quality of service identifier 5QI. In this way, transmission parameters are measured at a granularity of a 5QI or a QFI in the CU-DU separate base station architecture, so that normal running of a network system can be ensured, and user experience can be improved.

In a possible implementation of the fourth aspect, the method further includes: receiving, by the CU-CP, fourth information sent by the CU-UP, where the fourth information is used to indicate whether the transmission performance of the first data packet fulfills a transmission performance indicator, the transmission performance indicator is configured in the first data packet, and the third information includes the transmission performance indicator.

In a possible implementation of the fourth aspect, receiving, by the CU-CP, fourth information sent by the CU-UP includes: receiving, by the CU-CP, notification information sent by the CU-UP, where the notification information includes the fourth information.

In a possible implementation of the fourth aspect, receiving, by the CU-CP, fourth information sent by the CU-UP includes: receiving, by the CU-CP, a bearer modification request sent by the CU-UP, where the bearer modification request includes the fourth information.

In a possible implementation of the fourth aspect, the transmission performance indicator of the first data packet includes at least one of a delay budget of the first data packet, a packet loss rate of the first data packet, an uplink guaranteed bit rate GBR, a downlink GBR, a maximum uplink GBR, or a maximum downlink GBR.

In a possible implementation of the fourth aspect, the third information includes measurement configuration information, where the measurement configuration information includes a transmission performance parameter and/or a measurement time length of the first data packet; and the method further includes: receiving, by the CU-CP, fifth information sent by the CU-UP, where the fifth information includes a detection result of the transmission performance of the first data packet.

In a possible implementation of the fourth aspect, the transmission performance parameter includes at least one of a packet loss rate of the first data packet, a downlink transmission delay of the first data packet, a scheduled Internet Protocol throughput of the first data packet, or a data volume of the first data packet.

According to a fifth aspect, a communications apparatus is provided, including a processor, a memory, and a transceiver that are configured to support the communications apparatus in performing corresponding functions in the foregoing method. The processor, the memory, and the transceiver are connected by using a communications bus. The memory stores an instruction. The transceiver is configured to perform specific signal sending/receiving under the driving of the processor. The processor is configured to call the instruction to implement the communication method in the first aspect or the third aspect, or any one of the implementations of the first aspect or the third aspect.

According to a sixth aspect, a communications apparatus is provided, including a processing module, a storage module, and a transceiver module that are configured to support a terminal device in performing terminal device functions in the first aspect or the third aspect, or any one of the possible implementations of the first aspect or the third aspect. The functions may be implemented by hardware, or may be implemented by executing corresponding software by hardware. The hardware or the software includes one or more modules corresponding to the foregoing functions.

According to a seventh aspect, a communications apparatus is provided, including a processor, a memory, and a transceiver that are configured to support the communications apparatus in performing corresponding functions in the foregoing method. The processor, the memory, and the transceiver are connected by using a communications bus. The memory stores an instruction. The transceiver is configured to perform specific signal sending/receiving under the driving of the processor. The processor is configured to call the instruction to implement the communication method in the second aspect or the fourth aspect, or any one of the implementations of the second aspect or the fourth aspect.

According to an eighth aspect, a communications apparatus is provided, including a processing module, a storage module, and a transceiver module that are configured to support a terminal device in performing terminal device functions in the second aspect or the fourth aspect, or any one of the possible implementations of the second aspect or the fourth aspect. The functions may be implemented by hardware, or may be implemented by executing corresponding software by hardware. The hardware or the software includes one or more modules corresponding to the foregoing functions.

According to a ninth aspect, a communications system is provided, where the communications system includes the communications apparatus provided in the fifth aspect or the sixth aspect, and the communications apparatus provided in the seventh aspect or the eighth aspect. The communications system may complete the communication method provided in any one of the first aspect to the fourth aspect, or any one of the possible implementations of the first aspect to the fourth aspect.

According to a tenth aspect, a computer readable storage medium is provided, configured to store a computer program, where the computer program includes an instruction used to execute the method in any one of the first aspect to the fourth aspect, or any one of the possible implementations of the first aspect to the fourth aspect.

According to an eleventh aspect, a system chip is provided, including a processing unit and a communications unit, where the processing unit may execute a computer instruction, so that the chip in the terminal executes the method in any one of the first aspect to the fourth aspect, or any one of the possible implementations of the first aspect to the fourth aspect.

According to a twelfth aspect, a computer program product is provided, where the product includes an instruction used to execute the method in any one of the first aspect to the fourth aspect, or any one of the possible implementations of the first aspect to the fourth aspect.

DESCRIPTION OF EMBODIMENTS

Figure 1:
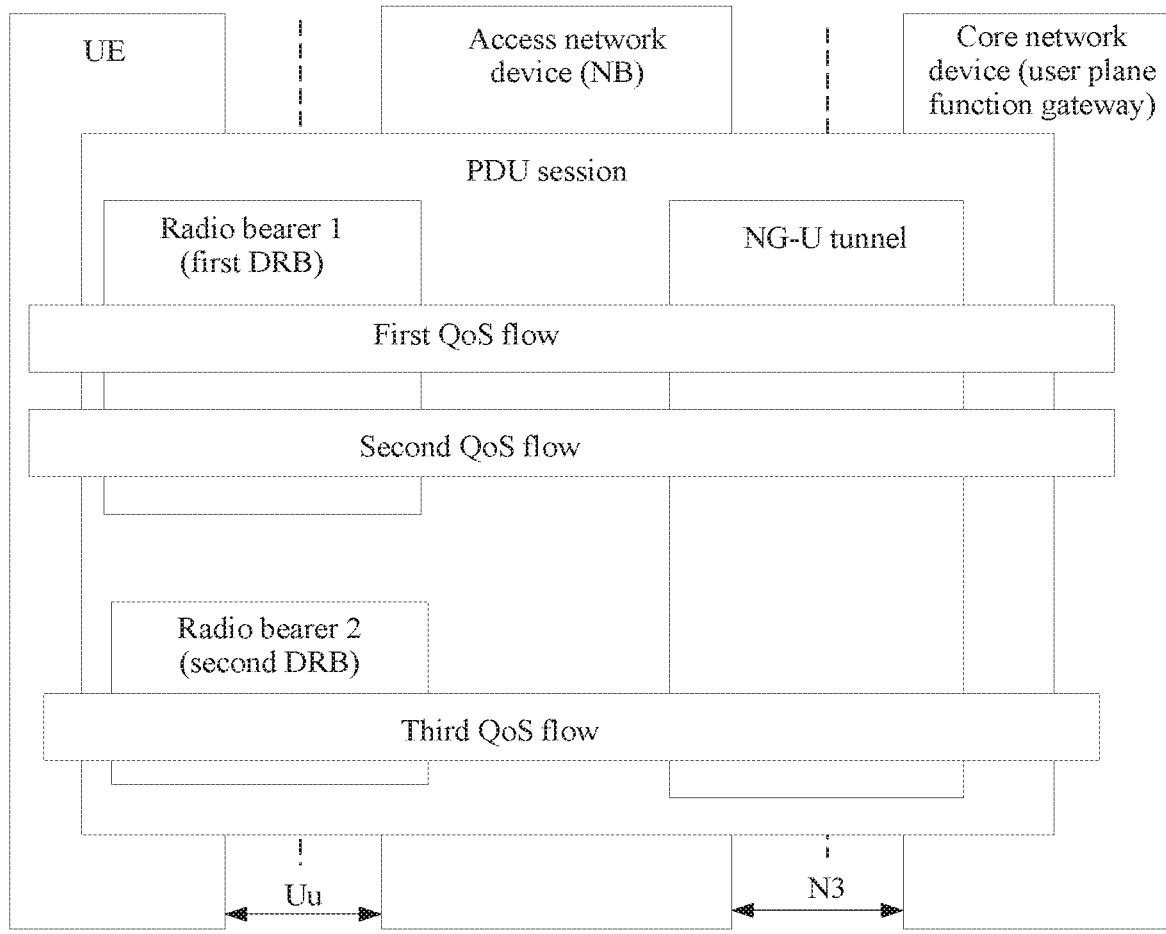
FIG. 1 is a schematic diagram of an existing network architecture based on QoS flows.

The following describes the technical solutions in this application with reference to the accompanying drawings.

As next-generation communications systems are fully and further studied, the industry has reached a basic consensus about specific content for studies on 5G. 5G supports various types of network deployment and various application types, including higher-rate experience and higher-bandwidth access capabilities, lower-latency and high-reliability information exchange, and access and management of larger quantities of low-cost machine type communication devices. To meet these requirements, 5G has defined a network architecture that is based on QoS flows, and the QoS flow is a finest granularity for implementing QoS differentiation for data packets in one PDU session. The QoS flows may include guaranteed bit rate (GBR) QoS flows and non-guaranteed bit rate (non-GBR) QoS flows. The guaranteed flow bit rate QoS flow may mean that transmission of data packets in this QoS flow needs to reach a specific bit rate. For the non-guaranteed flow bit rate QoS flow, a network provides transmission at a non-guaranteed flow bit rate for the QoS flow based on use of network resources.

For PDU sessions of a terminal device, one PDU session includes one or more QoS flows. A QoS flow identifier (QFI) is used to uniquely identify a QoS flow in a PDU session. All data packets mapped to one QoS flow have a same QoS processing characteristic, for example, a same scheduling policy, a same queuing management policy, or a same rate matching policy. A 5G QoS identifier (5QI) is used as a scalar value, and is used to characterize a specific QoS performance characteristic (namely, a QoS flow parameter) of data packets in a QoS flow, for example, a packet loss rate or a packet delay. For the non-guaranteed bit rate QoS flow, when a standardized 5QI is used, the QFI may be equivalent to the 5QI. In other scenarios where guaranteed bit rate and non-guaranteed bit rate QoS flows are included, the 5QI and the QFI may have different values.

Services (data packets) with a same QFI or 5QI in a PDU session are subject to, for example, same scheduling measurement configuration and same admission control. On a next generation network (NG) interface 3 (N3) (an interface between a core network device and an access network device), the QFI is carried in an encapsulation header of a data packet.

5G has defined a packet processing mechanism on an air interface based on DRBs. Data packets served by one DRB have a same packet processing mechanism on the air interface. The access network device establishes one or more DRB bearers for each PDU session of the terminal device, to transmit data packets in QoS flows that have different processing requirements in one PDU session, and maps data packets belonging to different QoS flows in the PDU session to different DRBs for transmission. That is, there is a mapping relationship from QoS flows to DRBs. The mapping relationship is as follows: For one PDU session of the terminal device, the PDU session is corresponding to one or more DRB bearers, and each DRB may be corresponding to one or more QoS flows in the PDU session. For example, it is assumed that, for one PDU session, the access network device has established three DRBs for the PDU session, and data packets in a QoS flow carried on each DRB have a same QoS processing characteristic, for example, a same scheduling policy, a same queuing management policy, or a same rate matching policy. The three DRBs are a first DRB, a second DRB, and the third DRB. The PDU session includes four QoS flows, and the four QoS flows are a first QoS flow, a second QoS flow, a third QoS flow, and a fourth QoS flow. The first QoS flow and the second QoS flow have a same QoS performance characteristic (or similar QoS performance characteristics), for example, same or similar delay and packet loss rate requirements. Data packets in the first QoS flow and the second QoS flow may be carried on the first DRB, meaning that the first QoS flow and the second QoS flow may be mapped to the first DRB. Data packets in the third QoS flow may be carried on the second DRB, meaning that the third QoS flow may be mapped to the second DRB. Data packets in the fourth QoS flow may be carried on the third DRB, meaning that the fourth QoS flow may be mapped to the third DRB.

FIG. 1 is a schematic diagram of an existing network architecture based on QoS flows. In FIG. 1, a PDU session is established between user equipment (UE), an access network device, and a core network device (for example, a user plane function gateway). As shown in FIG. 1, the access network device may be a NodeB (NB), an evolved NodeB (eNB or eNodeB), or a next generation radio access NodeB (gNB), or may be another access network (AN)/radio access network (RAN) device. The core network device is a user plane function gateway. A data packet bearer between the UE and the access network device is a radio bearer, for example, a DRB bearer. An interface between the UE and the access network device is an air interface (for example, Uu). Data or signaling may be transmitted between the UE and the access network device by using the air interface. A data packet bearer between the access network device and the core network is an NG-U tunnel bearer, and an interface between the access network device and the core network is an NG (such as N3) interface. Data or signaling between the access network device and the core network may be transmitted by using the NG interface. Data packets in the PDU session include data packets in three different QoS flows: a first QoS flow, a second QoS flow, and a third QoS flow. Data packets in the first QoS flow and the second QoS flow are carried on a first DRB, and data packets in the third QoS flow are carried on a second DRB. It should be understood that, when it is assumed that downlink data packets in the first QoS flow are mapped to the first DRB, uplink data packets in the first QoS flow may be mapped to the second DRB, or uplink data packets in the first QoS flow may be mapped to the first DRB. In other words, uplink data packets and downlink data packets in a QoS flow may be mapped to a same DRB, or may be separately mapped to different DRBs. For downlink (DL) data packets, that is, data packets sent by a base station to the UE, the base station maps downlink data packets in different QoS flows to different DRBs based on QFIs and corresponding QoS flow parameters on the NG-U (for example, N3) interface. The QFIs and the corresponding QoS flow parameters are notified by the core network device to the base station. Information that is about a QoS flow and sent by the core network device to the base station includes a QFI, a corresponding QoS flow parameter, and the like of the QoS flow. For example, the QoS flow parameter may include a delay requirement, a packet loss rate requirement, an averaging window size, and a maximum data burst volume. For uplink (UL) data packets, that is, data packets sent by the UE to the base station, the UE maps uplink data packets belonging to one or more QoS flows to one or more DRBs based on QoS flow to DRB mapping or reflective QoS flow to DRB mapping that is configured by the base station.

The base station controls UL QoS flow to DRB mapping in the following two mariners:

Manner 1: The base station explicitly notifies the UE of QoS flow to DRB mapping by using radio resource control (RRC) signaling, and the UE maps uplink data packets to a corresponding DRB based on the QoS flow to DRB mapping relationship, to perform uplink transmission. This manner is a non-reflective mapping manner. In the non-reflective mapping manner, uplink data packets and downlink data packets in a QoS flow may be separately mapped to different DRBs, or may be mapped to a same DRB.

Manner 2: A reflective mapping manner is used. The reflective mapping manner is as follows: The UE detects on which DRB a downlink data packet that carries a QFI is located, and then in UL, the UE maps an uplink data packet that carries the same QFI, also to the DRB for transmission. For example, if the UE detects that a downlink data packet (a data packet whose QoS flow is the first QoS flow) that carries a first QFI is transmitted on the first DRB, the UE transmits, in UL, an uplink data packet in the first QoS flow also on the first DRB. In the reflective mapping manner, uplink data packets and downlink data packets in a QoS flow are mapped to a same DRB.

When QoS flow to DRB mapping needs to be established in an initial PDU session establishment process, or when a mapping relationship from a QoS flow to a DRB needs to be changed upon change of a parameter of the QoS flow, the base station may instruct the UE to perform mapping from the QoS flow to a new DRB in the foregoing two manners.

In addition to the foregoing QoS flow to DRB mapping, the access network device usually performs L2 parameter measurement, to support air interface resource operations, radio resource management, network operation and maintenance, and MDT and SON requirements. For example, the access network device measures related parameters at a Service Data Adaptation Protocol (SDAP) layer, a PDCP layer, an RLC layer, a MAC layer, and a physical layer (PHY) layer, and configures or controls air interface resource operations, radio resource management, and the like based on the related parameters and data obtained through measurement, to ensure normal running of a network system.

In NR, the access network device (a base station is used as an example for description) may include a CU and a DU. This means that functions of the base station are split, so that some functions of the base station are deployed on one CU, and the remaining functions are deployed on a plurality of DUs. The plurality of DUs share the CU. This can reduce costs and facilitate ease of network expansion.

The CU has all or some RRC control functions, and includes all or some protocol layer functions of an existing base station. For example, the CU includes only some or all RRC functions, or includes RRC/SDAP layer functions, or includes RRC/SDAP/PDCP functions, or includes RRC/SDAP/PDCP functions and some RLC functions, or includes RRC/SDAP/PDCP/RLC/MAC functions and even some PHY functions. Any other possibility is not excluded.

The DU has all or some protocol layer functions of an existing base station, that is, some protocol layer functions of RRC/SDAP/PDCP/RLC/MAC/PHY. For example, the DU includes some RRC functions and SDAP/PDCP/RLC/MAC/PHY functions, or includes some or all SDAP/PDCP/RLC/MAC/PHY functions, or includes some or all PDCP/RLC/MAC/PHY functions, or includes some or all RLC/MAC/PHY functions, or includes some or all MAC/PHY functions, or includes only some or all PHY functions. It should be noted that the protocol layer functions mentioned herein may be changed and such changes all fall within the protection scope of this application.

Figure 2:
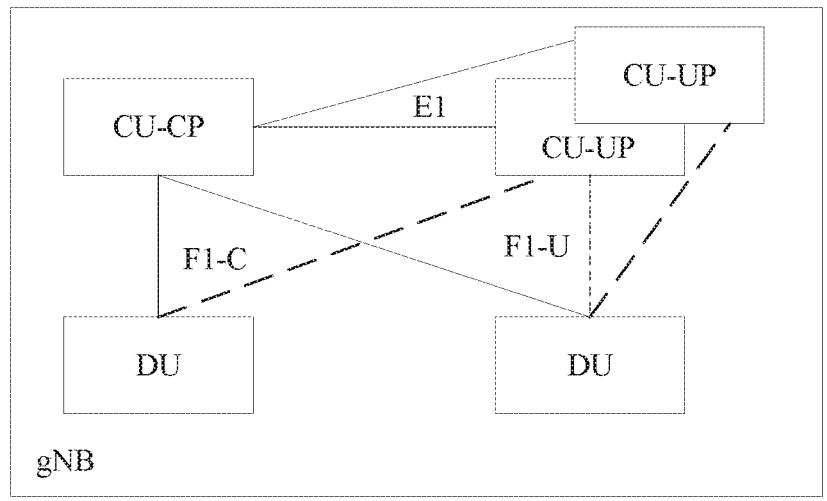
FIG. 2 is a schematic diagram of a base station architecture in which a CU-CP and a CU-UP are separated.

Further, at the CU part, the CU is divided into a CU-CP and a CU-UP. The CU-UP and the CU-CP may be on different physical devices. An open interface exists between the CU-CP and the CU-UP. FIG. 2 shows a base station architecture in which the CU-CP and the CU-UP are separated. The CU-CP part includes an RRC function and a control plane part of the PDCP (for example, used to process data on a signaling radio bearer). The CU-UP part includes a data plane part of the CU, and mainly includes data plane parts (for example, data on a radio bearer of the user equipment) of an SDAP protocol stack and a PDCP protocol stack.

As shown in FIG. 2, an open interface E1 exists between the CU-CP and the CU-UP, and is used to transmit, for example, signaling between the CU-CP and the CU-UP. There is an interface between the DU and each of the CU-CP and the CU-UP. For example, the interface between the CU-CP and the DU is an F1-C interface, and the interface between the CU-UP and the DU is an F1-U interface. In the architecture shown in FIG. 2, the following characteristics are further included:

one base station includes one CU-CP, a plurality of CU-UPs, and a plurality of DUs;
one DU can be connected only to one CU-CP;
one CU-UP can be connected only to one CU-CP;
one DU can be connected to a plurality of CU-Ups that are under control of a same CU-CP; and
one CU-UP can be connected to a plurality of DUs that are under control of a same CU-CP.

It should be understood that FIG. 2 is only an example and should not impose any limitation on the base station architecture. For example, in a CU-DU separate base station architecture, a base station may include only one CU-UP, one CU-CP, and one DU, or may include more CU-UPs and DUs. This is not limited in this application.

In the CU-DU separate base station architecture, how to effectively implement QoS flow management, that is, how to implement QoS flow to DRB mapping and how to support L2 parameter measurement, becomes an urgent challenge that needs to be addressed currently.

In view of the foregoing challenge, embodiments of this application provide a communication method so that QoS flow to DRB mapping can be implemented and L2 parameter measurement can be supported in a CU-DU separate base station architecture. Therefore, successful and normal transmission of user data can be ensured, network stability is improved, quality of network operation is improved, and user experience is improved.

Figure 3:
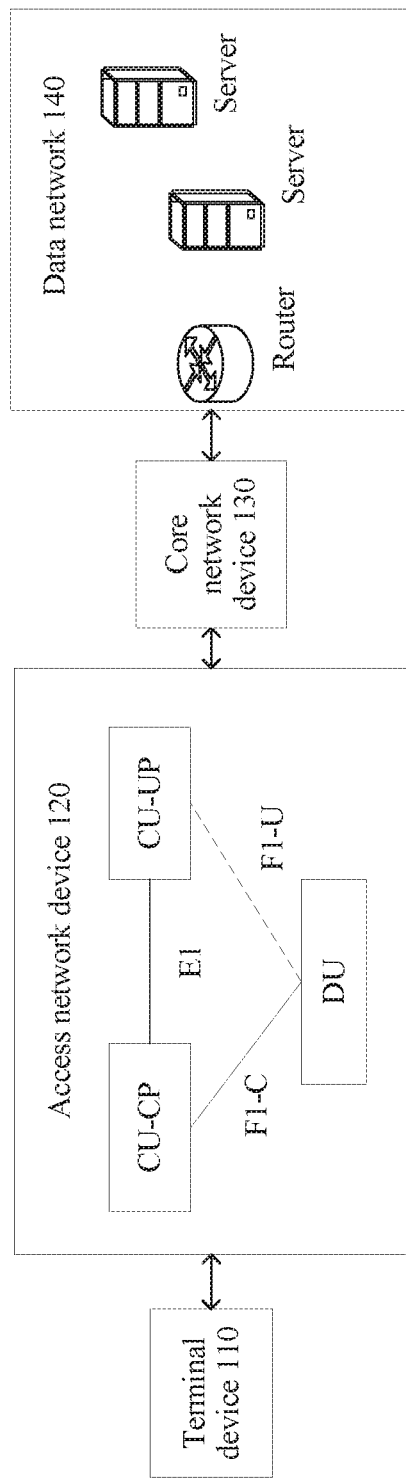
FIG. 3 is a schematic diagram of a typical communications system architecture applicable to a communication method provided in this application.

FIG. 3 is a schematic diagram of a typical communications system architecture applicable to a communication method provided in this application. As shown in FIG. 3, the system includes a terminal device 110, an access network device 120, a core network device 130, and a data network (DN) 140. The terminal device 110 may be configured to connect to the access network device 120 by using a wireless air interface, and then connect to the data network 140 via the core network device 130. The access network device 120 is mainly configured to implement functions such as a wireless physical layer function, resource scheduling, radio resource management, and radio access control. The access network device 120 has a CU-DU separate architecture. To be specific, the access network device is divided into a CU-CP, CU-UP, and a DU. Specific structures and functions thereof may be shown in FIG. 2, and reference may be made to the descriptions of FIG. 2. Details are not described herein again. The core network device 130 may include a management device and a gateway device. The management device is mainly configured to perform device registration, security authentication, mobility management, location management, and the like for the terminal device. The gateway device is mainly configured to establish a channel with the terminal device, and forward data packets between the terminal device and the external data network on the channel. The data network 140 may be corresponding to a plurality of different service domains, and is mainly used to provide a plurality of data services for the terminal device, and may include network devices such as servers (including a server providing a multicast service), routers, and gateways. In the foregoing network architecture, a user can implement, for example, data transmission and service application.

It should be understood that FIG. 3 is only an example architectural diagram. In addition to the function units shown in FIG. 3, the network architecture may further include other function units or function entities. This is not limited in this embodiment of this application.

It should be further understood that the terminal device may be user equipment (UE) such as a mobile phone or a computer, or may be a cellular phone, a cordless phone, a Session Initiation Protocol (SIP) phone, a smartphone, a wireless local loop (WLL) station, a personal digital assistant (PDA), a computer, a laptop computer, a handheld communications device, a handheld computing device, a satellite wireless device, a wireless modem card, a set top box (STB), customer premise equipment (CPE), and/or another device that performs communication in a wireless system. This is not limited in this embodiment of this application.

It should be further understood that the access network device may be a NodeB (NB), an evolved NodeB (eNB), or an access network (AN)/radio access network (RAN) device. A network includes a plurality of 5G-AN/5G-RAN nodes. The 5G-AN/5G-RAN node may be an access point (AP), a new radio NodeB (gNB), a transmission reception point (TRP), a transmission point (TP), or another access node. This is not limited in this embodiment of this application.

It should be further understood that the foregoing core network device may include function units such as an access and mobility management function (AMF), a session management function (SMF), a policy control function (PCF), and a user plane function (UPF). These function units may work independently, or may be combined to implement some control functions, Alternatively, the core network device may be a management device such as a mobility management entity (MME) or a policy and charging rules function (PCRF), and a gateway device such as a serving gateway (SGW), a packet data network gateway (PGW), or a local gateway (LGW). This is not limited in this embodiment of this application.

Figure 4:
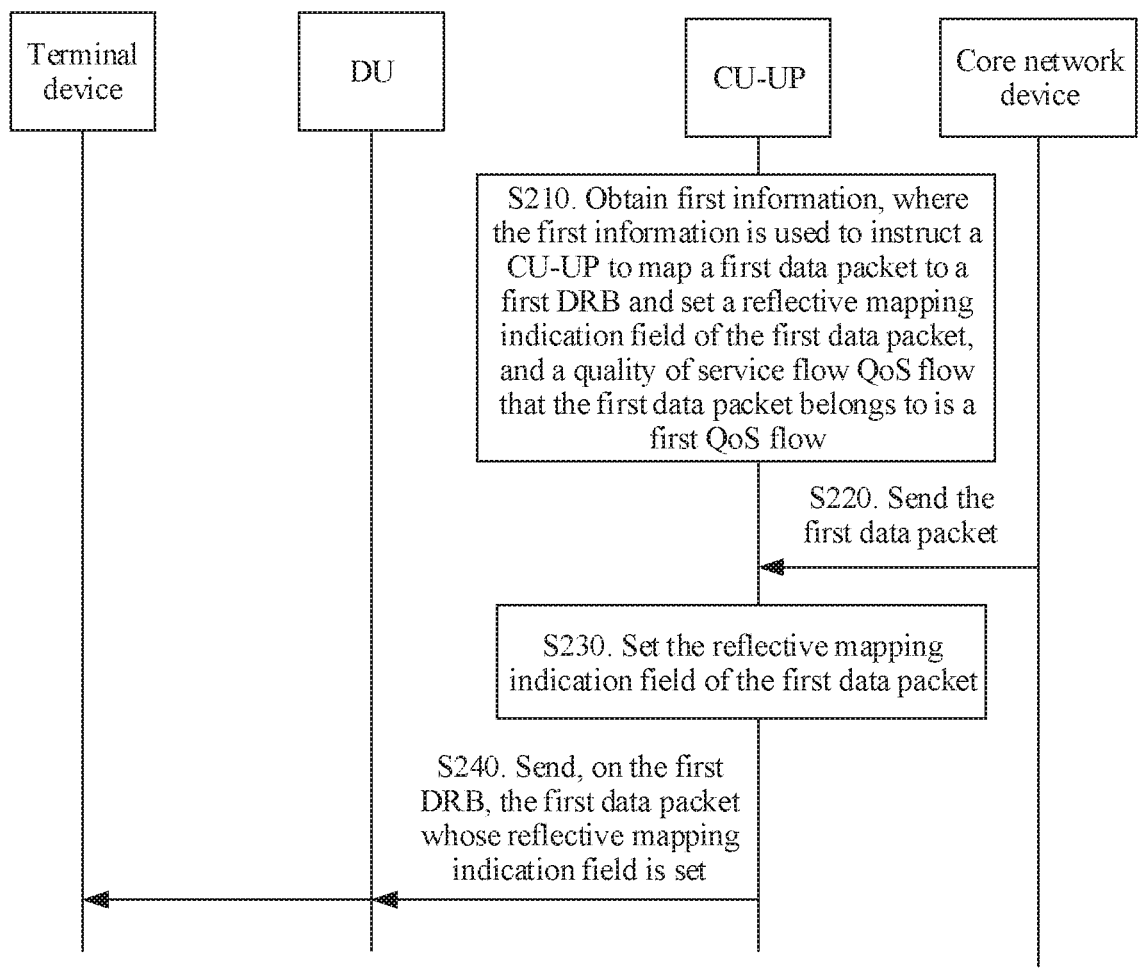
FIG. 4 is a schematic flowchart of a communication method according to an embodiment of this application.

With reference to FIG. 4, the following describes in detail the communication method provided in this application. FIG. 4 is a schematic flowchart of a communication method 200 according to an embodiment of this application. The method 200 may be applied to the scenario shown in FIG. 3, and certainly may also be applied to other communication scenarios. This is not limited in this embodiment of this application.

As shown in FIG. 4, the method 200 includes the following steps:

S210. A central unit-user plane node CU-UP obtains first information, where the first information is used to instruct the CU-UP to map a first data packet to a first data radio bearer DRB and set a reflective mapping indication field of the first data packet, and a quality of service flow QoS flow that the first data packet belongs to is a first QoS flow S220. The CU-UP receives the first data packet sent by a core network device.

S230. The CU-UP sets the reflective mapping indication field of the first data packet.

S240. The CU-UP sends, to a terminal device on the first DRB, the first data packet whose reflective mapping indication field is set. Specifically, the CU-UP sends the first data packet to the terminal device by using one or more DUs connected to the CU-UP.

In the communication method provided in this application, in a CU-DU separate base station architecture, when a mapping relationship from the first QoS flow to the first DRB needs to be established in an initial PDU session establishment process, or when the first data packet in the first QoS flow needs to be mapped, for transmission, to a new DRB (the first DRB) upon change of a parameter of the first QoS flow or a load status, the CU-UP obtains the first information, and determines whether reflective mapping from the first QoS flow to the first DRB is required. The quality of service flow QoS flow that the first data packet belongs to is the first QoS flow. Optionally, the first information may be pre-stored in the CU-UP. The first information is used to instruct the CU-UP to map the first data packet to the first DRB and set the reflective mapping indication field of the first data packet. The CU-UP determines, based on the first information, whether reflective mapping from the first QoS flow to the first DRB is required. After receiving the first data packet sent by the core network, the CU-UP sets the reflective mapping indication field of the first data packet, and sends, to the terminal device on the first DRB, the first data packet whose reflective mapping indication field is set. The first data packet is a downlink data packet sent by the CU-UP to the terminal device. A purpose of setting the reflective mapping indication field of the first data packet is to indicate to the terminal device whether reflective mapping from an uplink data packet in the first QoS flow to the first DRB is required, that is, whether the terminal device is instructed to send the uplink data packet in the first QoS flow to the CU-UP on the first DRB by using a DU. In this way, in this embodiment of this application, the first QoS flow is mapped to the first DRB in a CU-DU separate scenario, so that the first QoS flow is mapped to a corresponding DRB for both the CU-UP and the terminal device. This ensures that the terminal device and the CU-UP can correctly transmit data, improves communication efficiency and stability, and improves user experience.

Specifically, at S210, when the CU-UP needs to perform mapping from the first QoS flow to the first DRB, for example, when the mapping relationship from the first QoS flow to the first DRB needs to be established in the initial PDU session establishment process, or when an original DRB that carries the first QoS flow needs to be changed to the first DRB upon change of a parameter of the first QoS flow or a load status. For example, before the parameter of the first QoS flow or the load status is changed, the original DRB that carries the first QoS flow is a second DRB, and both uplink and downlink data packets in the first QoS flow are transmitted on the second DRB. After the parameter of the first QoS flow or the load status is changed, the second DRB may no longer meet a requirement of the first QoS flow, a DRB corresponding to the first QoS flow needs to be changed. The first QoS flow needs to be mapped to the first DRB (a new DRB). In this case, reflective mapping from the first QoS flow to the first DRB may be performed. Therefore, CU-UP may receive a first information, and the first information is used to instruct the CU-UP to map the first data packet to the first DRB and set the reflective mapping indication field of the first data packet, The first data packet is a downlink data packet sent by the CU-UP to the terminal device. A purpose of setting the reflective mapping indication field of the first data packet is to indicate to the terminal device whether reflective mapping from an uplink data packet in the first QoS flow to the first DRB is required, that is, whether the terminal device is instructed to send the uplink data packet in the first QoS flow to the CU-UP on the first DRB. The first information may further include related information of the first QoS flow and that of the first DRB, for example, a QoS flow parameter of the first QoS flow. The quality of service flow QoS flow that the first data packet belongs to is the first QoS flow. The first data packet may be all data packets in the first QoS flow in a PDU session of the terminal device, and an identifier of the first QoS flow is a first QFI or a first 5QI. The first information may include information about the first QoS flow and information about the first DRB, for example, including the identifier of the first QoS flow and an identifier of the first DRB, or may include information about the PDU session of the terminal device and the like. The first information may include a downlink SDAP header format indication and an uplink SDAP header format indication of the first DRB. The downlink SDAP header format indication is used to indicate whether a QoS flow mapped to the first DRB has a downlink SDAP header. The uplink SDAP header format indication is used to indicate whether a QoS flow mapped to the first DRB has an uplink SDAP header. The first information may include an indication whether the first DRB is a default DRB. This is not limited in this embodiment of this application.

At S220 and S230, after obtaining the first information, when determining whether reflective mapping from the first QoS flow to the first DRB is required for the first QoS flow, the CU-UP sets the downlink first data packet received from the core network device, that is, sets the reflective mapping indication field of the first data packet. The purpose of setting the reflective mapping indication field of the first data packet is to notify the terminal device whether reflective mapping from the uplink data packet in the first QoS flow to the first DRB is required. In other words, the terminal device is notified, in a reflective mapping manner, whether the terminal device is instructed to send the uplink data packet in the first QoS flow to the CU-UP on the first DRB.

At S240, the CU-UP sends, to the terminal device on the first DRB, the first data packet whose mapping field is set. Specifically, the CU-UP may first send, to the DU, the first data packet whose mapping field is set, and the DU sends the first data packet to the terminal device on the first DRB. The reflective mapping indication field of the first data packet is used to indicate to the terminal device whether reflective mapping from the uplink data packet in the first QoS flow to the first DRB is required. After receiving the first data packet, the terminal device first detects the reflective mapping indication field of the first data packet, and determines, based on the reflective mapping indication field of the first data packet, whether reflective mapping from the uplink data packet in the first QoS flow to the first DRB is required. For example, the terminal device and an access network device may negotiate in advance. When the terminal device detects that a bit of the reflective mapping indication field of the first data packet is 1, it indicates that the terminal device needs to perform reflective mapping from the uplink data packet to the first DRB. That is, after receiving the first data packet carried on the first DRB, the terminal device sends the uplink data packet in the first QoS flow to the CU-UP on the first DRB by using the DU, to complete reflective mapping. Alternatively, when the terminal device detects that a bit of the reflective mapping indication field of the first data packet is 0, it indicates that the terminal device is not to perform mapping from the first QoS flow to the first DRB. In this case, the terminal device still sends the uplink data packet in the first QoS flow on the original DRB that carries the first QoS flow. The original DRB that carries uplink data packets in the first QoS flow may be the first DRB, or may be another DRB.

It should be understood that when reflective mapping from the first QoS flow to the first DRB is required, in addition to the foregoing reflective mapping indication manner, a direct mapping (non-reflective mapping) manner may be used. The information about the first QoS flow and the first DRB may be directly notified to the terminal device. For example, the CU-CP sends, to the DU, the mapping relationship from the first QoS flow to the first DRB, and then the DU notifies the terminal device of the mapping relationship by using RRC signaling. The terminal device performs mapping from the first QoS flow to the first DRB based on the RRC signaling, that is, sends the uplink data packet in the first QoS flow to the CU-UP on the first DRB by using the DU. This is not limited in this embodiment of this application.

Figure 5:
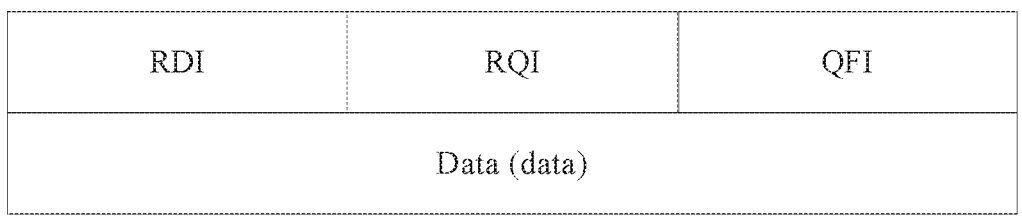
FIG. 5 is a schematic diagram of a format of a first data packet.

It should be further understood that the reflective mapping indication field of the first data packet may be a reflective QoS flow to DRB mapping indication (RDI) field of the first data packet. FIG. 5 is a schematic diagram of a format of a first data packet. The first data packet may be a protocol data unit of a downlink SDAP layer. A structure of the first data packet mainly includes an RDI field, a reflective QoS indication (RQI) field, a QFI field, and a data field. The QFI field is used to identify a QoS flow of the first data packet, namely, the QFI field of the first QoS flow is a first QFI, and may be used to instruct the terminal device to perform QoS flow to DRB mapping for the data packet in the first QoS flow. The RDI field is used to indicate whether mapping from the first QoS flow to a DRB needs to be updated or modified. For example, the following correspondence may be predefined:

when a bit of the RDI field is 1, it indicates that a rule of reflective mapping from the uplink data packet in the first QoS flow to the first DRB needs to be stored, and the uplink data packet in the first QoS flow needs to be mapped to the first DRB; and when a bit of the RDI field is 0, it indicates that no action is required, that is, a mapping relationship from the first QoS flow to the original DRB is unchanged, and reflective mapping from the uplink data packet in the first QoS flow to the first DRB is not indicated.

It should be understood that it is only an example that the bit of the RDI field being 1 indicates that the reflective mapping relationship from the first QoS flow to the DRB needs to be stored and the bit of the RDI field being 0 indicates no action. Information indicated by 0 and 1 may be interchanged. For example, the bit of the RDI field being 0 may indicate that the reflective mapping relationship from the first QoS flow to the DRB needs to be stored; and the bit of the RDI field being 1 may indicate no action. This is not limited in this embodiment of this application.

After obtaining the first information, the CU-UP sets the RDI field of the first data packet based on predefined bit information of the RDI field, and sends, to the terminal device, the first data packet whose RDI field is set. The terminal device may determine, based on the RDI field and the QFI field of the received first data packet, whether to perform reflective mapping and for which QoS flow reflective mapping is to be performed.

It should be understood that, in this embodiment of this application, the reflective mapping indication field of the first data packet may alternatively be another field of the first data packet, and the CU-UP may further instruct, by setting the another field of the first data packet, whether to perform reflective mapping from the uplink data packet in the first QoS flow to the first DRB. This is not limited in this embodiment of this application.

Figure 6:
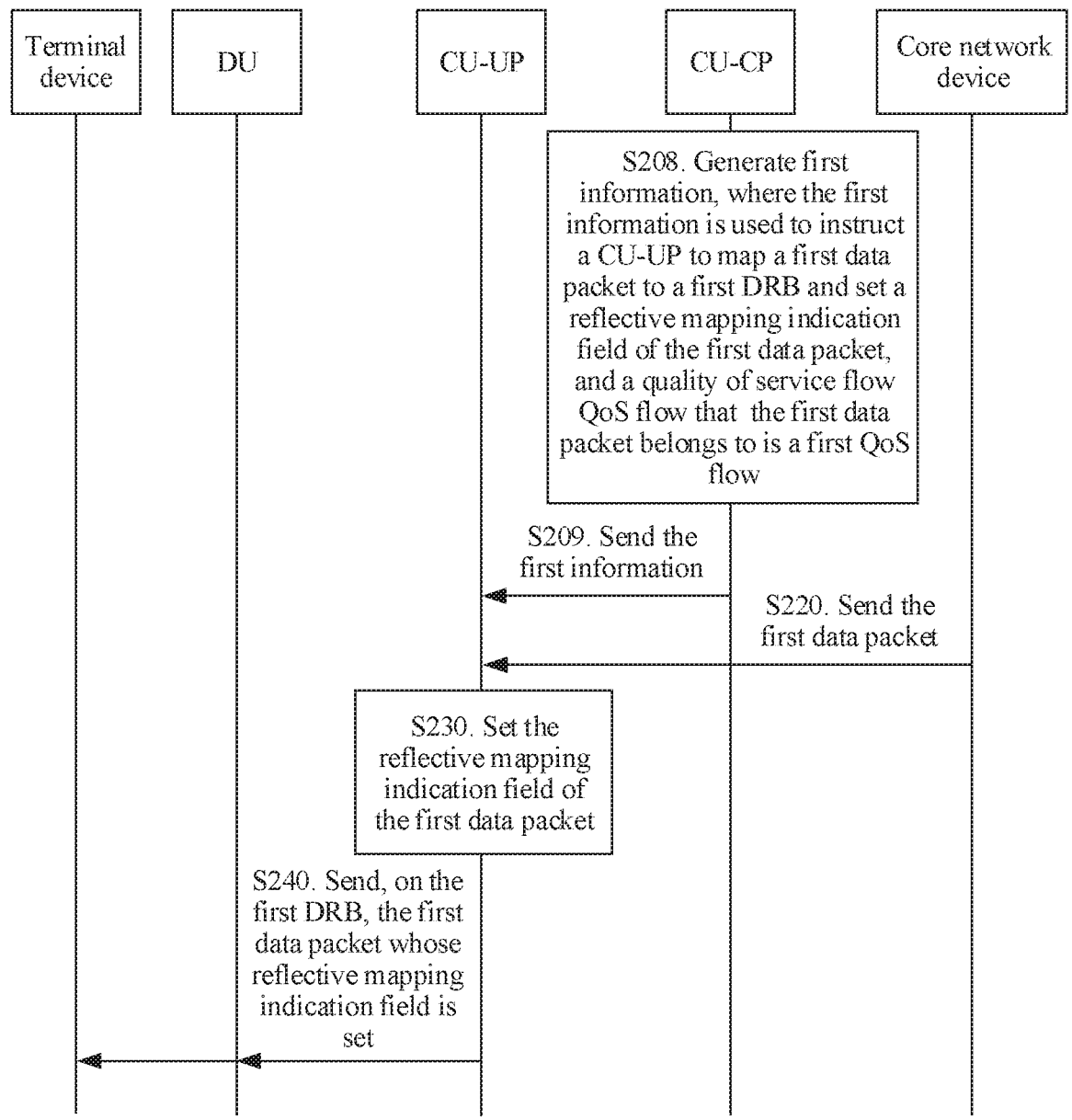
FIG. 6 is a schematic flowchart of a communication method according to another embodiment of this application.

Optionally, in an embodiment, as shown in FIG. 6, S210 in which the CU-UP obtains the first information includes the following steps:

S208. A central unit-control plane node CU-CP generates the first information.

S209. The central unit-control plane node CU-CP sends the first information to the CU-UP. Correspondingly, the CU-UP receives the first information sent by the CU-CP.

Specifically, when the CU-CP determines that mapping from the first QoS flow to the first DRB is required, for example, when mapping the relationship from the first QoS flow to the first DRB needs to be established in an initial PDU session establishment process, or when the original DRB that carries the first QoS flow needs to be changed to the first DRB upon change of a parameter of the first QoS flow or a load status, the CU-CP generates the first information. The first information is used to indicate whether reflective mapping from the first QoS flow to the first DRB is required. That is, the first information is used to instruct the CU-UP to map the first data packet to the first DRB and set the reflective mapping indication field of the first data packet. Based on the first information, the CU-UP maps the downlink first data packet to the first DRB and sets the reflective mapping indication field of the first data packet. The CU-CP may use an E1 interface between the CU-UP and the CU-CP to send or carry the first information in any possible signaling. For example, the first information may be carried in Application Protocol (AP) information (namely, an E1 AP message) on the E1 interface. This is not limited in this embodiment of this application.

It should be understood that information indicating requirement of that mapping from the first QoS flow to the first DRB may be notified by the core network device to the CU-CP, and the CU-CP generates the first information based on the information, and sends the first information to the CU-UP. The first information may include the information about the QoS flow and the information about the DRB, for example, including the identifier of the first QoS flow and the identifier of the first DRB, or may include the information about the PDU session of the terminal device and the like. This is not limited in this embodiment of this application.

In the communication method provided in this application, in the CU-DU separate base station architecture, when the CU-CP requires performing mapping from the first QoS flow to the first DRB, for example, when the first data packet in the first QoS flow needs to be mapped, for transmission, to the first DRB upon change of a parameter of the first QoS flow or a load status, the CU-CP determines, based on the foregoing condition, whether reflective mapping is required, and sends the first information to the CU-UP. The first information is used to instruct the CU-UP to set the reflective mapping indication field of the first data packet and map data of the first data packet to the first DRB. The CU-UP determines, based on the first information, whether reflective mapping from the first QoS flow to the first DRB is required. After setting the reflective mapping indication field of the first data packet received from the core network, the CU-UP sends, to the terminal device on the first DRB, the first data packet whose reflective mapping indication field is set. The first data packet is a downlink data packet sent by the CU-UP to the terminal device. The reflective mapping indication field of the first data packet is used to indicate to the terminal device whether reflective mapping from the uplink data packet in the first QoS flow to the first DRB is required, that is, whether to send the uplink data packet in the first QoS flow to the CU-UP on the first DRB. In this way, the first QoS flow is mapped to the first DRB in a CU-DU separate scenario, so that QoS flow to DRB mapping is implemented for both the CU-UP and the terminal device. This ensures that the terminal device and the CU-UP can correctly transmit data, improves communication efficiency and stability, and improves user experience.

Optionally, in an embodiment, S230 in which the CU-UP sets the reflective mapping indication field of the first data packet includes the following step:

The CU-UP sets a bit of the reflective mapping indication field of the first data packet to 1.

Specifically, an example in which the reflective mapping indication field is an RDI field is used for description. It is assumed that a bit of the RDI field is predefined as follows: When the bit of the RDI field is 1, it indicates that the mapping relationship for the first QoS flow needs to be modified to the first DRB; and when the bit of the RDI field is 0, it indicates that the mapping relationship from the first QoS flow to the first DRB is unchanged. In this case, the CU-UP sets the bit of the RDI field of the first data packet to 1, to instruct the terminal device to map the uplink data packet in the first QoS flow to a new DRB (the first DRB). In other words, the mapping relationship from the first QoS flow to the first DRB is changed. The CU-UP sets the bit of the RDI field to 1, and a QFI field indicates the first QFI, in other words, indicates that a QoS flow is the first QoS flow. After the terminal device receives the first data packet carried on the first DRB, the terminal device determines, based on information about the RDI field and the QFI field, that the uplink data packet in the first QoS flow needs to be transmitted on the first DRB, that is, needs to perform mapping from the first QoS flow to the first DRB, and sends, to the CU-UP on the first DRB, a data packet whose QoS flow is the first QoS flow.

In the communication method provided in this embodiment of this application, the bit of the reflective mapping indication field of the first data packet is set to 1 to instruct the terminal device to perform mapping from the first QoS flow to the first DRB. Therefore, accuracy and efficiency that the terminal device determines that mapping from the first QoS flow to the first DRB is required can be improved, thereby facilitating ease of implementation and reducing signaling overheads and resource consumption.

It should be understood that, when the bit of the RDI field being 0 indicates that the mapping relationship for the first QoS flow needs to be modified to the first DRB and the bit of the RDI field being 1 indicates that the mapping relationship from the first QoS flow to the first DRB is unchanged, the CU-UP sets the bit of the RDI field of the first data packet to 0, to instruct the terminal device to map the uplink data packet in the first QoS flow to a new DRB (that is, the first DRB). This is not limited in this embodiment of this application.

It should be further understood that an example in which the reflective mapping indication field has one bit is used in the foregoing for description. The reflective mapping indication field may alternatively have a plurality of bits. For example, when the reflective mapping indication field has two bits, the bits of the reflective mapping indication field being 11 may indicate that the mapping relationship for the first QoS flow needs to be modified to the first DRB; and the bits of the reflective mapping indication field being 00 may indicate that the mapping relationship from the first QoS flow to the first DRB is unchanged. The CU-UP may set the bits of the reflective mapping indication field of the first data packet to 11. This is not limited in this embodiment of this application.

Optionally, in an embodiment, S230 in which the CU-UP sets the reflective mapping indication field of the first data packet includes the following step:

The CU-UP sets a bit of the reflective mapping indication field of the first data packet to 0.

Specifically, an example in which the reflective mapping indication field is an RDI field is used for description. It is assumed that a bit of the RDI field is predefined as follows: When the bit of the RDI field is 1, it indicates that the mapping relationship for the first QoS flow needs to be modified to the first DRB; and when the bit of the RDI field is 0, it indicates that the mapping relationship from the first QoS flow to the first DRB is unchanged. In this case, the CU-UP sets the bit of the reflective mapping indication field of the first data packet to 0, to notify the terminal device that the mapping relationship from the first QoS flow to the first DRB is unchanged. It should be understood that setting the bit of the reflective mapping indication field to 0 is only to notify the terminal device that the mapping relationship from the first QoS flow to the first DRB is unchanged, and there is no need to perform mapping from the first QoS flow to the first DRB. It does not indicate that the terminal device is incapable of performing mapping from the first QoS flow to the first DRB. The terminal device itself is capable of performing mapping from the first QoS flow to the first DRB. Alternatively, the terminal device may determine, based on, for example, a load status and a network condition, to perform mapping from the first QoS flow to the first DRB. After the terminal device receives the first data packet carried on the first DRB, the terminal device may not need to read information about a QFI field based on information about the RDI field, where the bit of the RDI field being 0 indicates that mapping from the first QoS flow to the first DRB is not required. The terminal device still sends the data packet in the first QoS flow to the CU-UP on the original DRB that carries data packets in the first QoS flow.

In the communication method provided in this embodiment of this application, the bit of the reflective mapping indication field of the first data packet is set to 0 to instruct the terminal device not to perform mapping from the first QoS flow to the first DRB. Therefore, accuracy and efficiency that the terminal device determines that mapping from the first QoS flow to the first DRB is not required can be improved, thereby facilitating ease of implementation and reducing signaling overheads and resource consumption.

It should be understood that, when the bit of the RDI field being 0 indicates that the mapping relationship for the first QoS flow needs to be modified to the first DRB and when the bit of the RDI field being 1 indicates that the mapping relationship from the first QoS flow to the first DRB is unchanged, the CU-UP sets the bit of the RDI field of the first data packet to 1, to instruct the terminal device not to perform mapping from the first QoS flow to the first DRB. This is not limited in this embodiment of this application.

Optionally, in an embodiment, the first information is information indicating reflective mapping from the first QoS flow to the first DRB.

Specifically, there are two manners of instructing the terminal device to map the first QoS flow to the first DRB. In a first manner, the terminal device is directly notified of the mapping relationship from the first QoS flow to the first DRB. This manner is a direct mapping manner. Specifically, the direct mapping manner may be as follows: The CU-CP sends, to the DU, the mapping relationship from the first QoS flow to the first DRB, and then the DU notifies the terminal device of the mapping relationship by using RRC signaling. The terminal device performs mapping from the first QoS flow to the first DRB based on the RRC signaling. Another manner is a reflective mapping manner. When the first information is the information indicating reflective mapping from the first QoS flow to the first DRB, the CU-UP determines, based on the first information, to use the reflective mapping manner to instruct the terminal device to perform mapping from the first QoS flow to the first DRB. The reflective mapping manner is as follows: The CU-UP sends the downlink data packet in the first QoS flow to the terminal device on the first DRB, and if the terminal device detects that the downlink data packet in the first QoS flow is on the first DRB, the terminal device transmits, in UL, the uplink data packet in the first QoS flow also on the first DRB.

It should be understood that the first information may further include the related information of the first QoS flow and that of the first DRB, for example, information such as the identifier of the first QoS flow and the identifier of the first DRB. Alternatively, the first information may include other related information, for example, information about a PDU session related to the first QoS flow, such as a PDU session ID. The first information may include the downlink SDAP header format indication and the uplink SDAP header format indication of the first DRB. The downlink SDAP header format indication is used to indicate whether a QoS flow mapped to the first DRB has a downlink SDAP header. The uplink SDAP header format indication is used to indicate whether a QoS flow mapped to the first DRB has an uplink SDAP header. The first information may include an indication whether the first DRB is a default DRB. This is not limited in this embodiment of this application.

It should be further understood that, when the first information is not the information indicating reflective mapping from the first QoS flow to the first DRB, that is, when the first information does not include a reflective mapping indication, the terminal device may be instructed, in the direct mapping manner or the reflective mapping manner, to perform mapping from the first QoS flow to the first DRB. This is not limited in this embodiment of this application.

Figure 7:
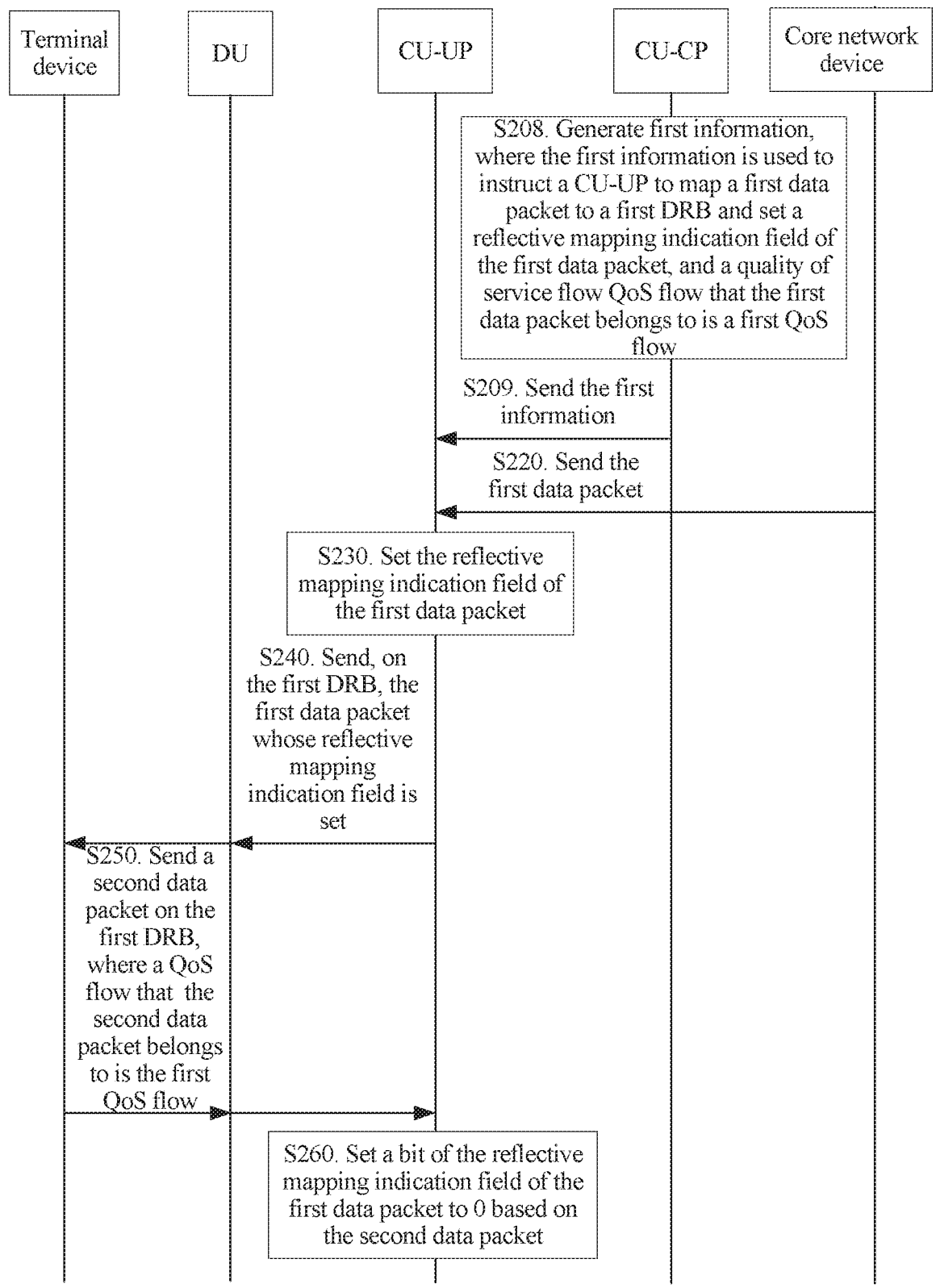
FIG. 7 is a schematic flowchart of a communication method according to another embodiment of this application.

Optionally, in an embodiment, as shown in FIG. 7, the method 200 further includes the following steps:

S250. The CU-UP receives a second data packet sent by the terminal device on the first DRB, where a QoS flow that the second data packet belongs to is the first QoS flow.

S260. The CU-UP sets the bit of the reflective mapping indication field of the first data packet to 0 based on the second data packet.

Specifically, an example in which the reflective mapping indication field is an RDI field is used for description. It is assumed that a bit of the RDI field is predefined as follows: When the bit of the RDI field is 1, it indicates that the mapping relationship for the first QoS flow needs to be modified to the first DRB; and when the bit of the RDI field is 0, it indicates that the mapping relationship from the first QoS flow to the first DRB is unchanged. After receiving the first data packet that is carried on first DRB and whose reflective mapping indication field is set, the terminal device detects a DRB that carries the first data packet and the RDI field and a QFI field of the first data packet. Based on that fact that the bit of the reflective mapping indication field of the first data packet, that is, the bit of the RDI field of the first data packet is 1, and a fact that the QFI field of the first data packet identifies the first QoS flow, reflective mapping is performed for the first QoS flow. After receiving a first data packet, if the terminal device detects that a DRB that carries the first data packet is the first DRB, the bit of the RDI field is 1, indicating that the mapping relationship from the first QoS flow to the DRB needs to be modified, and the QFI field indicates the first QoS flow, the terminal device determines that mapping from the first QoS flow to the first DRB is required for data packets in the first QoS flow, that is, determines to send data packets in the first QoS flow to the CU-UP on the first DRB. The terminal device sends second data packets to the DU on the first DRB based on related information of the first data packet, and after receiving a second data packet, the DU forwards the second data packet to the CU-UP. The QoS flow that the second data packet belongs to is the first QoS flow. This means that the terminal device has correctly performed mapping from the first QoS flow to the first DRB. After receiving the second data packet, the CU-UP determines that the terminal device has correctly performed mapping from the first QoS flow to the first DRB, and then sets the bit of the reflective mapping indication field of the first data packet to 0, to indicate to the terminal device that mapping the uplink data packet in the first QoS flow to the first DRB is no longer required after reception of the first data packet.

The terminal device continuously detects the RDI field and the QFI field of first data packets. After the CU-UP determines that the terminal device has correctly performed mapping from the first QoS flow to the first DRB, because the bit of the RDI field of the first data packet is previously set to 1, where the bit of the RDI field being 1 indicates that the mapping relationship for the first QoS flow needs to be modified to the first DRB, if the CU-UP does not set the bit of the reflective mapping indication field of the first data packet to 0, when detecting that the bit of the RDI field of the first data packet is 1, the terminal device further needs to continuously detect a QFI field of each first data packet and a DRB that carries the first data packet, to determine the DRB corresponding to the first QoS flow. However, the mapping relationship from the first QoS flow to the first DRB may be unchanged actually, and the first QoS flow is still corresponding to the first DRB. Consequently, resource waste is caused, and power consumption of the terminal device is increased. Therefore, the CU-UP sets the bit of the RDI field of the first data packet to 0 after determining that the terminal device has correctly performed mapping from the first QoS flow to the first DRB. After receiving a subsequent first data packet, if detecting that the bit of the RDI field of the first data packet is 0, the terminal device determines that the mapping relationship from the first QoS flow to the first DRB is unchanged. When reflective mapping from the first QoS flow to the first DRB is not required, the terminal device does not need to continue to detect the QFI field of the first data packet and the first DRB that carries the first data packet. Therefore, resources can be saved, power consumption of the terminal device can be reduced, and user experience can be improved.

It should be understood that, when the bit of the RDI field of the first data packet being 0 indicates that the mapping relationship from the first QoS flow to the DRB needs to be modified and the bit of the RDI field being 1 indicates that the mapping relationship from the first QoS flow to the first DRB is unchanged, after receiving the second data packet sent by the terminal device on the first DRB, the CU-UP may set the bit of the reflective mapping indication field of the first data packet to 1. This is not limited in this embodiment of this application.

It should be further understood that, at S250, when sending the second data packet to the CU-UP on the first DRB, the terminal device may first send the second data packet to the DU on the first DRB, and then the DU sends the second data packet to the CU-UP. This is not limited in this embodiment of this application.

Optionally, in an embodiment, S209 in which the CU-CP sends the first information to the CU-UP includes the following step:

The CU-CP sends a bearer context setup request to the CU-UP, where the bearer context setup request includes the first information.

Specifically, when the CU-CP requires performing mapping from the first QoS flow to the first DRB, the CU-CP generates the first information. The first information is used to instruct the CU-UP to map the data of the first data packet to the first DRB and set the reflective mapping indication field of the first data packet. The CU-CP may send the first information to the CU-UP by using the E1 interface between the CU-CP and the CU-UP. Specifically, the CU-CP may send the bearer context setup request to the CU-UP by using the E1 interface, and the bearer context setup request includes the first information. The bearer context setup request may be used to request the CU-UP to establish a bearer that is related to a PDU session between the CU-UP and the terminal device, for example, a DRB bearer and a signaling radio bearer (SRB) that are used to transmit related signaling, data, and the like between the CU-UP and the terminal device. In other words, the CU-CP sends the first information to the CU-UP by using the bearer context setup request. It should be understood that the bearer context setup request may further include the related information of the first QoS flow and that of the first DRB, or may include the related information of the PDU session of the terminal device. This is not limited in this embodiment of this application.

Optionally, in an embodiment, S209 in which the CU-CP sends the first information to the CU-UP includes the following step:

The CU-CP sends a bearer modification request to the CU-UP, where the bearer modification request includes the first information.

Specifically, when the CU-CP requires performing mapping from the first QoS flow to the first DRB, the CU-CP generates the first information. Specifically, the CU-CP may send the bearer modification request to the CU-UP by using the E1, and the bearer modification request includes the first information. The bearer modification request may be used to request the CU-UP to modify a related bearer between the CU-UP and the terminal device, for example, a DRB and an SRB bearer, and the DRB and the SRB may be used to transmit related signaling, data, and the like between the CU-UP and the terminal device. In other words, the CU-CP sends the first information to the CU-UP by using the bearer modification request. It should be understood that the bearer modification request may further include the related information of the first QoS flow and that of the first DRB, or may include the related information of the PDU session of the terminal device. The first information may include the downlink SDAP header format indication and the uplink SDAP header format indication of the first DRB. The downlink SDAP header format indication is used to indicate whether a QoS flow mapped to the first DRB has a downlink SDAP header. The uplink SDAP header format indication is used to indicate whether a QoS flow mapped to the first DRB has an uplink SDAP header. The first information may include an indication whether the first DRB is a default DRB. This is not limited in this embodiment of this application.

It should be understood that, in this embodiment of this application, the first information may be carried in other signaling sent by the CU-CP to the CU-UP, for example, carried in notification information sent by the CU-CP to the CU-UP. This is not limited in this embodiment of this application.

Figure 8A:
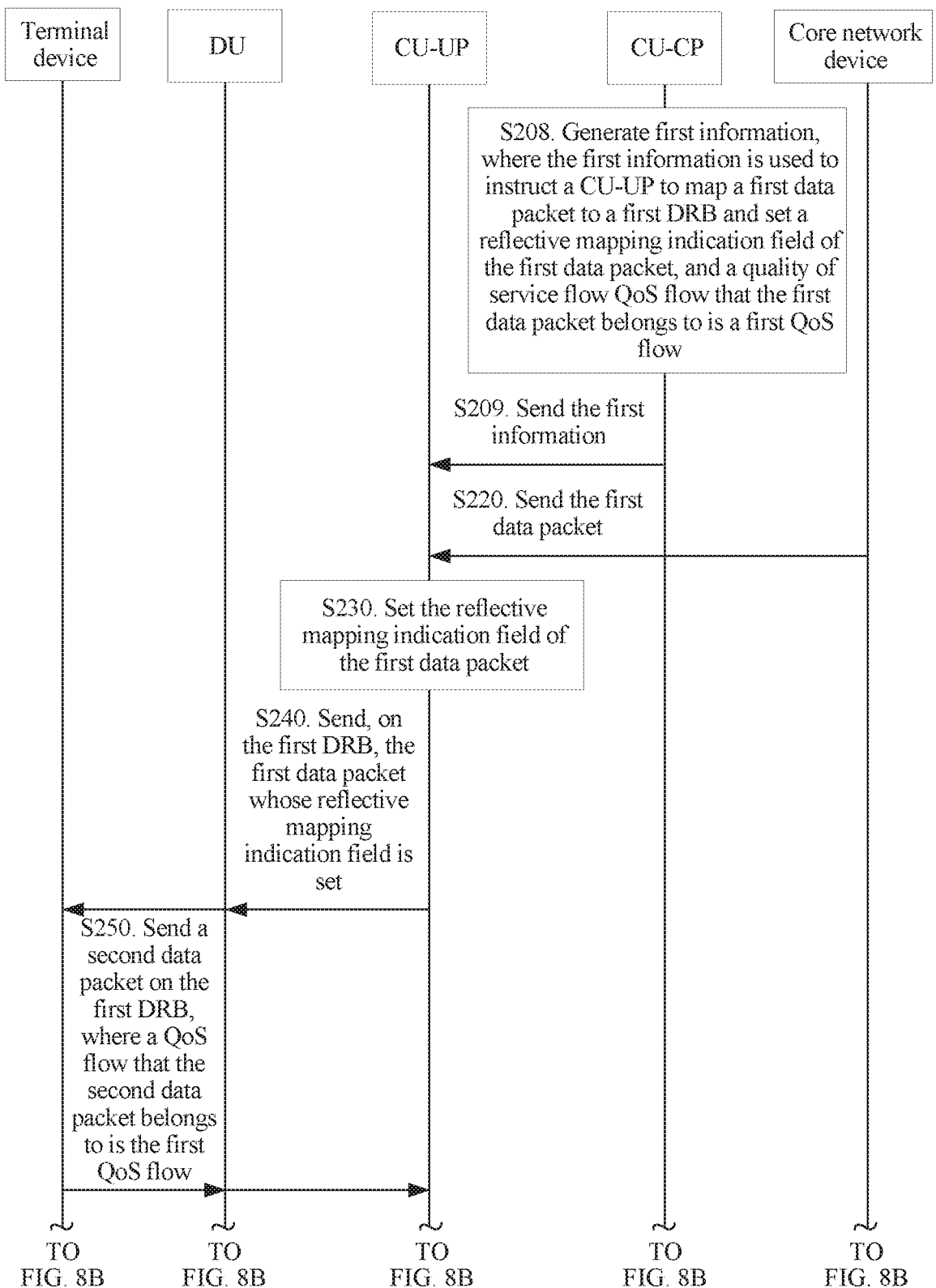
FIG. 8A and FIG. 8B are a schematic flowchart of a communication method according to another embodiment of this application.
Figure 8B:
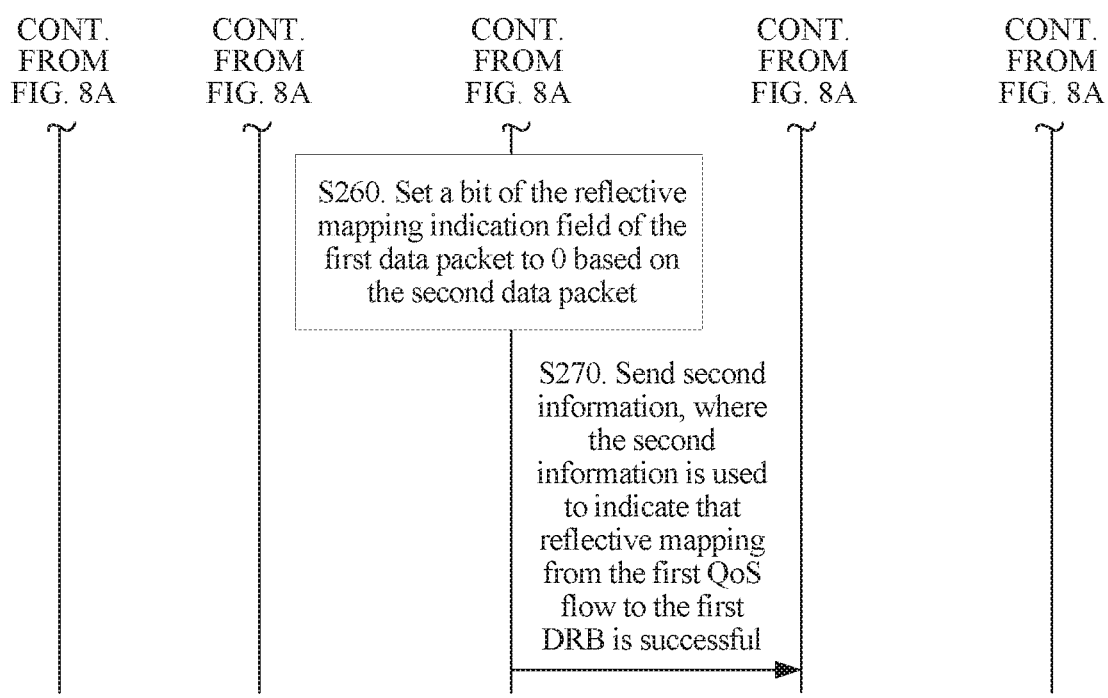

Optionally, in an embodiment, as shown in FIG. 8B, the method 200 further includes the following step:

S270. The CU-UP sends second information to the CU-CP, where the second information is used to indicate that reflective mapping from the first QoS flow to the first DRB is successful. Correspondingly, the CU-CP receives the second information.

Specifically, after receiving the second data packet sent by the terminal device on the first DRB, that is, after determining that the terminal device has correctly performed mapping from the first QoS flow to the first DRB, the CU-UP notifies the CU-CP that reflective mapping from the first QoS flow to the first DRB is successfully performed, by sending the second information to the CU-CP. The second information is used to indicate that reflective mapping from the first QoS flow to the first DRB is successful. After receiving the second information, the CU-CP learns that reflective mapping from the first QoS flow to the first DRB is correctly performed, and then the CU-CP may correctly perform data processing and the like on a radio bearer of the PDU session of the terminal device. Therefore, data transmission stability of the terminal device is improved, user experience is improved, and normal running of a system is ensured.

It should be understood that, when the CU-UP receives no second data packet sent by the terminal device on the first DRB, that is, when a data packet that is in the first QoS flow and is received by the CU-UP is not transmitted on the first DRB, it indicates that reflective mapping has failed. The CU-UP may notify the CU-CP of information indicating that reflective mapping has failed, so that the CU-CP later determines whether reflective mapping is still required or whether the first QoS flow needs to be released. Therefore, network stability is ensured, and quality of network operation is improved.

This application further provides a communication method, so that data transmission performance measurement and L2 parameter measurement can be supported in a CU-DU separate base station architecture. Therefore, user data can be successfully transmitted, network stability is improved, quality of network operation is improved, and user experience is improved.

Figure 9:
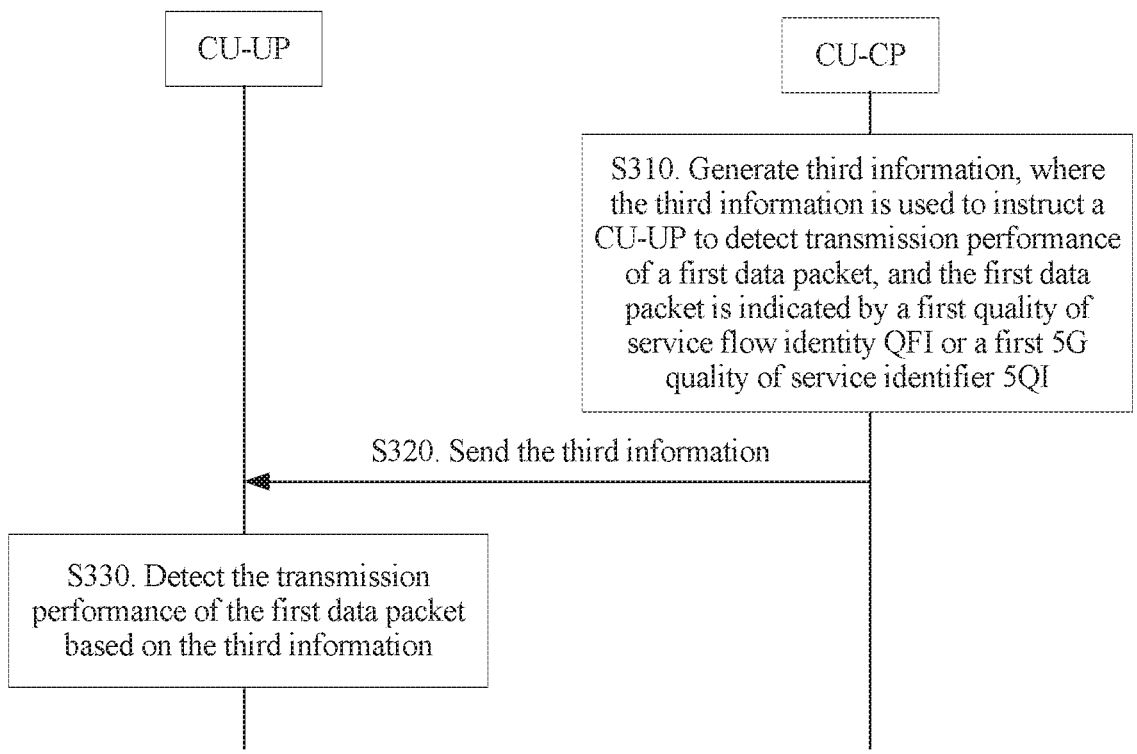
FIG. 9 is a schematic flowchart of a communication method according to an embodiment of this application.

With reference to FIG. 9, the following describes in detail the communication method provided in this application. FIG. 9 is a schematic flowchart of a communication method 300 according to an embodiment of this application. The method 300 may be applied to the scenario shown in FIG. 3, and certainly may also be applied to another communication scenario. This is not limited in this embodiment of this application.

As shown in FIG. 9, the method 300 includes the following steps:

S310. A CU-CP generates third information, where the third information is used to instruct a CU-UP to detect transmission performance of a first data packet, and the first data packet is identified by a first quality of service flow identifier QFI or a first 5G quality of service identifier 5QI.

S320, The CU-CP sends the third information to the CU-UP, and correspondingly, the CU-UP receives the third information.

S330. The CU-UP detects the transmission performance of the first data packet based on the third information.

In the communication method provided in this application, in a CU-DU separate base station architecture, when the CU-CP requires detection of performance of a first QoS flow in a PDU session of a terminal device, the CU-CP sends the third information to the CU-UP. The third information is used to instruct the CU-UP to detect the transmission performance of the first data packet (a data packet in the first QoS flow), and the first data packet is identified by the first QFI. When the CU-CP requires detection of all first data packets with a same QoS characteristic for the terminal device, the third information is used to instruct the CU-UP to detect the transmission performance of the first data packet, and the first data packet is identified by the first 5QI. The CU-UP detects the transmission performance of the first data packet based on the third information. In this way, transmission parameters are measured at a granularity of a 5QI or a QFI in the CU-DU separate base station architecture, so that normal running of a network system can be ensured, and user experience can be improved.

Specifically, at S310, in the CU-DU separate base station architecture, to support normal running of the network system, related transmission performance needs to be measured, so that related configuration or control of data transmission may be supported or adjusted in a timely manner by measuring the transmission performance. For example, L2 parameter measurement is required, to support air interface resource operations, radio resource management, network operation and maintenance, MDT and SON requirements, and the like. For example, related transmission parameters of the first data packet at a PDCP layer, an RLC layer, a MAC, and an SDAP layer need to he detected. Therefore, the CU-CP generates the third information, and the third information is used to instruct the CU-UP to detect the transmission performance of the first data packet. In addition, 5G has defined a network architecture that is based on QoS flows, and the QoS flow is a finest granularity for implementing QoS differentiation in one PDU session.

When the CU-CP requires detection of performance of a first QoS flow in a PDU session of a terminal device, that is, detection of the performance of the first data packet, a quality of service flow QoS identifier of the first data packet is the first QFI, that is, the transmission parameter is measured at a granularity of a QFI. When the CU-CP requires detection of all first data packets with a same QoS characteristic for the terminal device, the first data packet is identified by the first 5QI, and the transmission parameter is measured at a granularity of a 5QI. It should be understood that, when the 5QI and the QFI have equal values, the QoS flow may be identified by using either the 5QI or the QFI; or when the 5QI and the QFI have unequal values, the QoS flow needs to be identified by using the 5QI.

It should be understood that the third information may further include related information of the first QoS flow, for example, a parameter of the first QoS flow, an identifier (the first QFI or the first 5QI) of the first QoS flow, information about a PDU session related to the first QoS flow, notification control of the first QoS flow, and related transmission performance that needs to be measured by the CU-UP. The notification control of the first QoS flow is used to instruct the CU-UP to detect the transmission performance of the first QoS flow, for example, a packet delay budget, a packet error rate, a downlink guaranteed bit rate, a maximum downlink bit rate, an uplink guaranteed bit rate, a maximum uplink bit rate, a maximum downlink packet loss rate, a maximum uplink packet loss rate, a maximum data burst volume. This is not limited in this embodiment of this application.

At S320, the CU-CP sends the third information to the CU-UP, and correspondingly, the CU-UP receives the third information. Specifically, the CU-CP may use an E1 interface between the CU-UP and the CU-CP to send or carry the third information in any possible signaling. For example, the third information may be carried in an E1AP message on the E1 interface. This is not limited in this embodiment of this application.

At S330, the CU-UP measures the transmission parameter at a granularity of a QFI or a 5QI based on the third information.

That is, the CU-UP detects the transmission performance of the first data packet, and the first data packet is identified by the first QFI or the first 5QI.

In the communication method provided in this application, the CU-UP measures the transmission parameter at a granularity of a 5QI or a QFI in the CU-DU separate base station architecture. Therefore, normal operation of the network system can be ensured, accuracy and a success rate of data transmission of a user can be ensured, communication efficiency of the user can be improved, and user experience can be improved.

Figure 10:
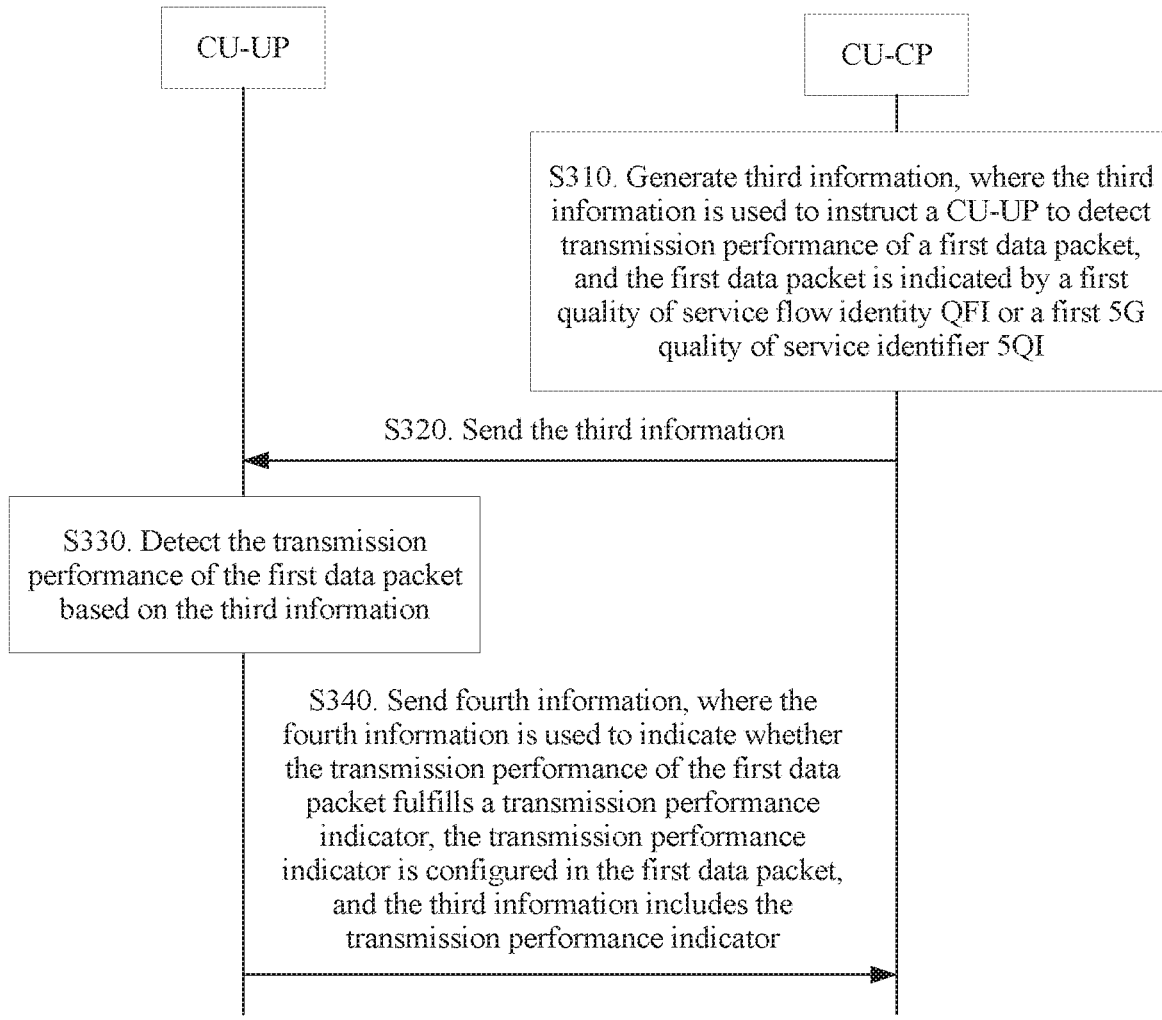
FIG. 10 is a schematic flowchart of a communication method according to another embodiment of this application.

Optionally, in an embodiment, as shown in FIG. 10, the method 300 further includes the following step:

S340. The CU-UP sends fourth information to the CU-CP, where the fourth information is used to indicate whether the transmission performance of the first data packet fulfills a transmission performance indicator, the transmission performance indicator is configured in the first data packet, and the third information includes the transmission performance indicator. Correspondingly, the CU-CP receives the fourth information.

Specifically, in a PDU session at a granularity of a QoS flow, transmission performance indicators that need to be met by all QoS flows are different. For example, for some high-priority services, QoS flows corresponding to the services need to fulfill a relatively high transmission indicator. These QoS flows need to fulfill a GBR requirement, a transmission delay requirement, or the like. Therefore, the third information includes the transmission performance indicator. For example, the transmission performance indicator may be a packet loss rate requirement that needs to be met by the first QoS flow (a QoS flow that the first data packet belongs to), that is, a packet loss rate cannot exceed a threshold. Alternatively, the transmission performance indicator may be a GBR requirement that needs to be met by the first QoS flow. The transmission performance indicator is configured in the first data packet in the first QoS flow, that is, the transmission performance indicator needs to be fulfilled when the first data packet is transmitted. After receiving the third information, the CU-UP detects, based on the transmission performance indicator in the third information and the first QFI, the transmission performance of the first data packet whose QoS flow identifier is the first QFI in data packets in uplink and downlink transmission. The CU-UP detects the transmission performance of the first data packet based on the transmission performance indicator, and determines, based on the detected transmission performance of the first data packet and the configured transmission performance indicator, whether the first data packet has fulfilled a transmission requirement. Then, the CU-UP notifies, by using the fourth information, the CU-CP whether the transmission performance of the first data packet meets the transmission performance indicator, For example, when detecting that all data packets in the first QoS flow fail to fulfill the GBR requirement, the CU-UP notifies, by using the fourth information, the CU-CP that the first QoS flow fails to fulfill the GBR requirement; or when detecting that all first data packets in the first QoS flow meet the GBR requirement, the CU-UP notifies, by using the fourth information, the CU-CP that the first QoS flow has fulfilled the GBR requirement. Therefore, the CU-CP sends the information to a core network, and the core network determines, based on the information, whether to change the parameter of the QoS flow or release the QoS flow. This ensures that the network system can run normally, improves a guaranteed rate for normal communication of the user, improves stability and working efficiency of the network system, and improves user experience.

It should be understood that the CU-UP may report a quantity or proportion of first data packets that have fulfilled the transmission performance indicator within a time period. Alternatively, if one first data packet fails to fulfill the transmission performance indicator within a time period, it is considered that the first QoS flow (all the first data packets) fails to fulfill the transmission performance indicator within the time period. Alternatively, there may be other reporting manners. This is not limited in this embodiment of this application.

It should be further understood that the fourth information may further include information such as a detected value of the transmission performance of the first QoS flow, and the information about the PDU session related to the first QoS flow, for example, information such as a PDU session ID and the identifier of the first QoS flow. This is not limited in this embodiment of this application.

It should be further understood that when no QoS flow in a PDU session of the terminal device meets a QoS flow transmission performance indicator or all QoS flows in a PDU session of the terminal device meet QoS flow transmission performance indicators, the CU-UP may notify, by using the fourth information, the CU-CP of a message that the PDU session fails to fulfill or fulfills QoS flows transmission performance indicator, instead of notifying, on a per QoS flow basis, the CU-CP of a message that each QoS flow fails to fulfill or fulfills a QoS flow transmission performance indicator. This is not limited in this embodiment of this application.

It should be further understood that before the CU-UP detects the transmission performance of the first data packet, the CU-CP may further notify the CU-UP of information about all QoS flows in the PDU session of the terminal device. For example, the information may be information such as parameters and identifiers of all the QoS flows in the PDU session. After receiving the information about all the QoS flows in the PDU session, the CU-UP may perform an admission control process, to determine an admissible QoS flow in all the QoS flows based on the information about all the QoS flows and with reference to a load status and the like of the CU-UP, and detect transmission performance of an admitted QoS flow. The first QoS flow may be any one of QoS flows admitted by the CU-UP. The admitted QoS flow may be understood as a QoS flow that can be used to transmit data. Specific steps of the admission control process are as follows:

1. When the core network device establishes a new PDU session for the terminal device or a new QoS flow for the PDU session, or a QoS flow characteristic of the PDU session is changed, the core network device notifies the CU-CP of information about the QoS flow For example, the information may be GRB information of the QoS flow. The CU-CP may notify the CU-UP of the information about the QoS flow by using the E1 interface between the CU-CP and the CU-UP through a setup request or a modification request. For example, the information about the QoS flow may include content shown in Table 1.

TABLE 1

5QI
Choice QoS flow characteristics
Non-dynamic 5QI
Non dynamic 5QI descriptor
Dynamic 5QI
Dynamic 5QI descriptor
Allocation and retention priority
Guaranteed bit rate QoS flow information
Reflective QoS attribute Content included in the dynamic 5QI descriptor is shown in the following Table 2:

TABLE 2

Priority level
Delay budget
Packet error rate
Delay critical
Averaging window
Maximum data burst volume It should be understood that the content shown in Table 1 and Table 2 is only an example, and the information about the QoS flow and the dynamic 5QI descriptor may further include more content. This is not limited in this embodiment of this application.

2. The CU-UP performs QoS flow admission based on the load status of the CU-UP and the information about the QoS flow, for example, the QoS flow parameters in Table 1 and Table 2, and feeds back an admission result to the CU-CP in a setup request response or a modification request response. The admission result may include an ID of an admitted QoS flow; an ID of a PDU session of the QoS flow, an ID of a QoS flow that is not admitted, an ID of a PDU session of the QoS flow that is not admitted, and a reason that the QoS flow is not admitted. For example, the reason that the QoS flow is not admitted may be radio resources not available, an unknown 5QI, or an invalid 5QI. If all QoS flows in a PDU session are rejected, an ID of the PDU session is further included. After determining the admitted QoS flow, the CU-UP may detect transmission performance of the admitted QoS flow based on the third information sent by the CU-CP, to determine whether a transmission performance indicator is fulfilled. It should be understood that when a plurality of QoS flows in a PDU session are admitted, the admission result may include a list of IDs of the admitted QoS flows. When a plurality of QoS flows in a PDU session are rejected, the admission result may include a list of IDs of the rejected QoS flows.

It should be understood that, in this embodiment of this application, in addition to the information in the foregoing Table 1 and Table 2 and the load status of the CU-UP, the CU-UP may further perform admission control on a QoS flow based on other information, for example, service information carried in a data packet in the QoS flow This is not limited in this embodiment of this application.

Optionally, in an embodiment, S340 that the CU-UP sends fourth information to the CU-CP includes the following step:

The CU-UP sends notification information to the CU-CP, where the notification information includes the fourth information, and correspondingly, the CU-CP receives the notification information.

Specifically, when the CU-UP needs to notify the CU-CP whether the first data packet fulfills the transmission performance indicator, the CU-UP may send the fourth information to the CU-CP by using the E1 interface between the CU-CP and the CU-UP. Specifically, the CU-UP may send the notification information to the CU-CP by using the E1 interface, and the notification information includes the fourth information. The notification information may be used to instruct the CU-CP to establish a bearer that is related to a PDU session with the terminal device, and notify the CU-CP of QoS flow information. In other words, the notification information carries the fourth information. It should be understood that the notification information may further include the related information of the first QoS flow and the related information of the PDU session of the terminal device. This is not limited in this embodiment of this application.

It should be understood that after receiving the notification information, the CU-CP may further send a notification information response to the CU-UP, to notify the CU-UP that the fourth information has been received. This is not limited in this embodiment of this application.

Optionally, in an embodiment, S340 in which the CU-UP sends fourth information to the CU-CP includes the following step:

The CU-UP sends a bearer modification request to the CU-CP, where the bearer modification request includes the fourth information. Correspondingly, the CU-CP receives the bearer modification request.

Specifically, when the CU-UP needs to notify the CU-CP whether the first data packet fulfills the transmission performance indicator, the CU-UP may send the fourth information to the CU-CP by using the E1 interface between the CU-CP and the CU-UP. Specifically, the CU-UP may send the bearer modification request to the CU-CP by using the E1 interface, and the bearer modification request includes the fourth information. The bearer modification request may be used to request the CU-CP to modify a related bearer with the terminal device, for example, a DRB or an SRB bearer, and the DRB or the SRB may be used to transmit related signaling, data, and the like between the CU-UP and the terminal device. In other words, the CU-UP sends the fourth information to the CU-CP by using the bearer modification request. It should be understood that the bearer modification request may further include the related information of the first QoS flow and the related information of the PDU session of the terminal device. This is not limited in this embodiment of this application.

It should be understood that, in this embodiment of this application, the fourth information may be carried in other signaling sent by the CU-UP to the CU-CP. This is not limited in this embodiment of this application.

It should be understood that after receiving the bearer modification request, the CU-CP may further send bearer modification request response information to the CU-UP, to notify the CU-UP that the fourth information has been received. This is not limited in this embodiment of this application.

Optionally, in an embodiment, the transmission performance indicator of the first data packet includes at least one of the following:

a delay budget of the first data packet, a packet loss rate of the first data packet, an uplink guaranteed bit rate GBR, a downlink GBR, a maximum uplink GBR, or a maximum downlink GBR.

Specifically, in the PDU session of the terminal device, different services have different transmission performance requirements, that is, data packets of different services have different QoS flow requirements, and different QoS flows need to fulfill different transmission performance indicators. Therefore, for the first data packet (whose QoS flow is the first QoS flow), the transmission performance indicator of the first QoS flow may include at least one of the delay budget of the first data packet, the packet loss rate of the first data packet, the uplink guaranteed bit rate GBR, the downlink GBR, the maximum uplink GBR, the maximum downlink GBR, a maximum downlink packet loss rate, a maximum uplink packet loss rate, or a maximum data burst volume. For example, when the transmission performance indicator is the downlink GBR, the CU-UP detects, based on the downlink GBR transmission indicator of the first data packet, whether the downlink first data packet meets the downlink GBR requirement, and sends, to the CU-CP, whether the first data packet fulfills the downlink GBR transmission indicator.

It should be understood that, in addition to the foregoing transmission performance indicators, the transmission performance indicator of the first data packet may further include other transmission performance indicators, for example, a maximum data throughput. This is not limited in this embodiment of this application.

Figure 11:
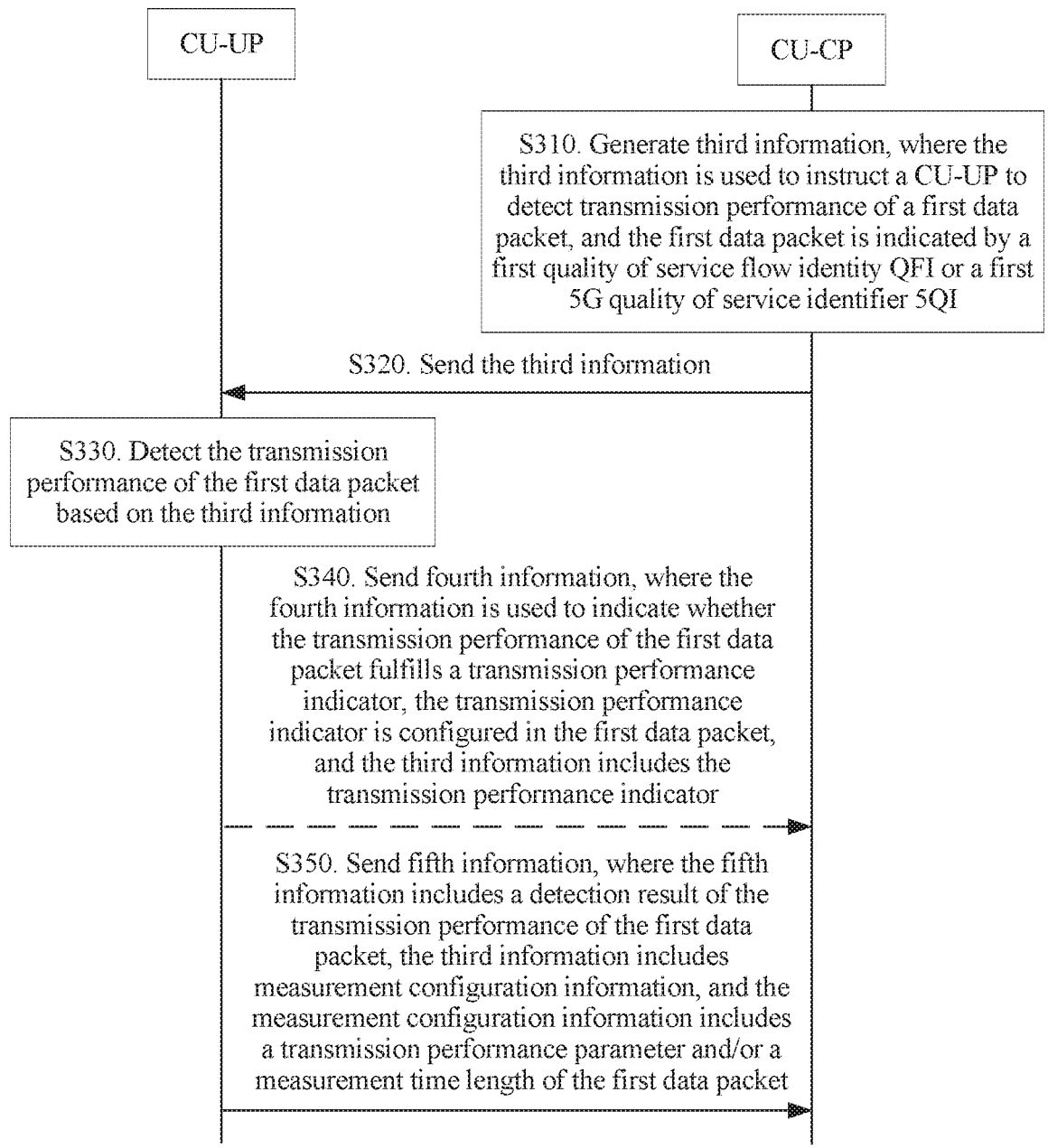
FIG. 11 is a schematic flowchart of a communication method according to still another embodiment of this application.

Optionally, in an embodiment, as shown in FIG. 11, the method 300 further includes the following step:

S350. The CU-UP sends fifth information to the CU-CP, where the fifth information includes a detection result of the transmission performance of the first data packet, the third information includes measurement configuration information, and the measurement configuration information includes a transmission performance parameter and/or a measurement time length of the first data packet. Correspondingly, the CU-CP receives the fifth information.

Specifically, the CU-UP needs to perform L2 parameter measurement to support air interface resource operations, radio resource management, network operation and maintenance, MDT and SON requirements, and the like. For example, the CU-UP measures a related parameter at the PDCP layer, the RLC layer, the MAC layer, or the like. Therefore, the third information sent by the CU-CP to the CU-UP includes the measurement configuration information, and the measurement configuration information includes the transmission performance parameter and/or the measurement time length of the first data packet. The CU-UP measures the transmission parameter based on the measurement configuration information at a granularity of a QFI or a 5QI, that is, detects the transmission performance of the first data packet. When the measurement configuration information includes the transmission performance parameter of the first data packet, the CU-UP may determine the measurement time length based on a predefined time length or a service status of the first data packet, and detect the transmission performance of the first data packet. When the measurement configuration information includes the measurement time length of the first data packet, the CU-UP may determine, based on information such as a QoS flow load status and a QoS flow service type of the first data packet, that the transmission performance needs to be detected, and detect the transmission performance of the first data packet. The first data packet is identified by the first 5QI, and it is determined that the transmission performance needs to be detected, and the transmission performance of the first data packet is detected. The first data packet is indicated by the first 5QI. For a data packet, when a QFI and a 5QI have a same value, either the QFI or the 5QI may be used to indicate the data packet; or when a QFI and a 5QI have different values, the data packet needs to be identified by the 5QI. That is, when all first data packets for all terminal devices are detected, the first data packet is identified by the first 5QI, to detect transmission performance of all data packets whose QoS flows are the first 5QI for all the terminal devices. The CU-UP detects the transmission performance of the first data packet at L2, and notifies the CU-CP of the detection result of the transmission performance of the first data packet. Therefore, the CU-CP supports L2 parameter measurement, so that a function of supporting air interface resource operations, radio resource management, network operation and maintenance, and MDT and SON requirements is implemented. This helps improve network stability, improve quality of network operation, and improve user experience. It should be understood that a step shown by a dashed line in FIG. 11 is an optional step.

Optionally, in an embodiment, the transmission performance parameter includes at least one of a packet loss rate of the first data packet, a downlink transmission delay of the first data packet, a scheduled Internet Protocol throughput of the first data packet, or a data volume of the first data packet.

The following describes in detail a process in which the CU-UP measures the foregoing transmission performance parameters.

1. For the downlink transmission delay of the first data packet, a detection granularity is the first QFI and/or the first 5QI, that is, an average downlink transmission delay that is within a time period T and that is of all data packets (all the first data packets) whose QoS flow identifier is the first QFI and/or the first 5QI is measured. When a QoS flow identifier of the first data packet is the first 5QI, performance detection is performed on all data packets whose QoS flow identifiers are the first 5QI for all the terminal devices. When a QoS flow identifier of the first data packet is the first QFI, performance detection is performed on a data packet with the first QFI for the terminal device.

Specifically, the average downlink transmission delay of the first data packet within the time period T may be calculated by using a formula (1):

$$M(T, 5qi) = \left\lfloor \frac{\sum_{\forall i} tAck(i) - tArriv(i)}{I(T)} \right\rfloor \quad (1)$$

In the formula (1), M(T, 5qi)) represents the average downlink transmission delay of first data packets with a same 5QI (the first 5QI) within the time period T, and when a 5QI and a QFI of a QoS flow are the same, the 5QI may also be the QFI; t(Arriv(i) represents a time point (moment) at which an $i^{th}$ first data packet arrives; tAck(i) is a time point (moment) at which the $i^{th}$ first data packet is successfully received; i represents a sequence number of a data packet that arrives and is successfully received within the time period T; and I(T) represents a total quantity of first data packets within the time period T.

A reference point of the arrival moment of the first data packet is a service access point (SAP) at the PDCP layer or a service access point at the SDAP layer, and a reference point of the moment at which the first data packet is successfully received is the SAP at the PDCP layer or the service access point at the SDAP layer. The SAP is a point, in a protocol stack, at which an upper layer provides a service when the upper layer accesses a lower layer, is a logical interface for implementing mutual communication between entities (an "entity" is a logical function of a corresponding layer) at adjacent layers, and is located at a boundary between two layers. Whether the access point is located at an upper part of a protocol layer or a lower part of the protocol layer is not limited herein. For example, the reference point of the moment at which the first data packet is successfully received is an upper SAP at the PDCP layer or an upper service access point at the SDAP layer. Alternatively, the reference point of the moment at which the first data packet is successfully received is a lower SAP at the PDCP layer or a lower service access point at the SDAP layer. Starting from a physical layer, each layer provides a service access point to an upper layer. Each layer has a SAP, but SAPs at different layers have different content and representation forms.

Figure 12:
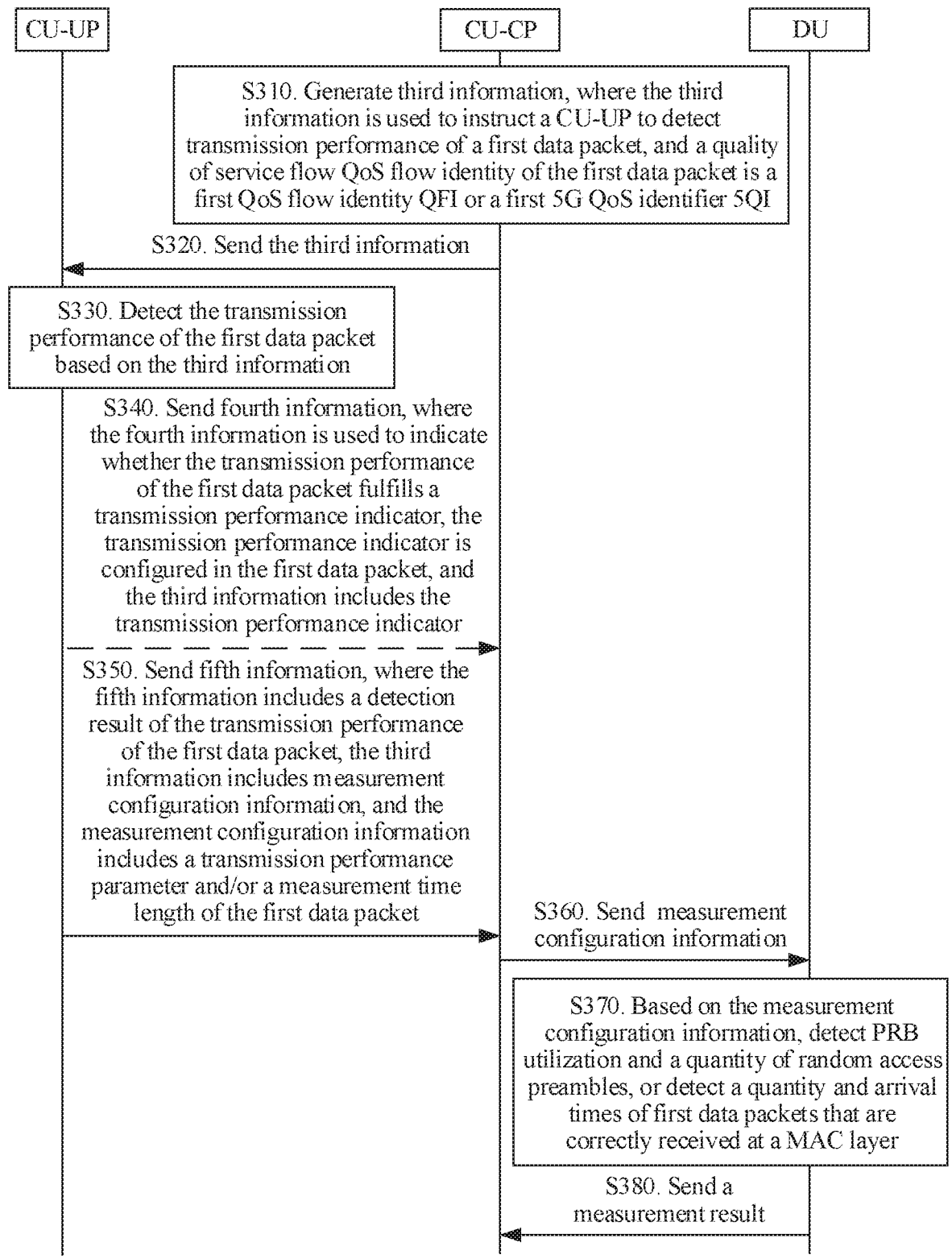
FIG. 12 is a schematic flowchart of a communication method according to still another embodiment of this application.

Optionally, a reference point of the arrival moment of the first data packet may be a SAP at the PDCP layer or a SAP at the SDAP layer, and a reference point of the moment at which the first data packet is successfully received is a SAP at the MAC layer. Whether the access point is located at an upper part of a protocol layer or a lower part of the protocol layer is not limited herein. For example, the reference point of the arrival moment of the first data packet may be a lower SAP at the PDCP layer, and the reference point of the moment at which the first data packet is successfully received is a lower service access point at the MAC layer. It should be understood that, in this case, a DU needs to calculate a quantity and arrival times of first data packets that are correctly received at the MAC layer, and the like, and notify the CU-CP of the information. As shown in FIG. 12, at S360, the CU-CP may send the measurement configuration information to the DU. The measurement configuration information includes the related information of the first QoS flow, such as the parameter of the first QoS flow, the identifier (the first QFI or the first 5QI) of the first QoS flow, and the information about the PDU session related to the first QoS flow. At S370, the DU calculates, based on the measurement configuration information, the quantity and the arrival times of first data packets that are correctly received at the MAC layer. At S380, the DU notifies the CU-CP of a detection result. This is not limited in this embodiment of this application.

Optionally, to make the measurement more accurate, the CU-CP may notify the CU-UP of an absolute time of measurement, for example, an absolute moment at which detection starts and an absolute moment at which detection ends. This is not limited in this embodiment of this application.

The CU-UP may detect the downlink transmission delay of the first data packet based on the foregoing formula (1) at a granularity of a QFI and/or a 5QI, and notify the CU-CP of a detection result.

It should be understood that, the CU-UP detects the downlink transmission delay of the first data packet based on the foregoing formula (1) at a granularity of a QFI and/or a 5QI; in addition, the CU-UP may further detect the downlink transmission delay of the first data packet based on another formula or a formula obtained by changing the formula (1). This is not limited in this embodiment of this application.

2. For detection of the packet loss rate (packet discard rate) of first data packets that are discarded due to network congestion, traffic management, or the like in a downlink transmission process of the first data packets, the following formula (2) may be used to calculate an average packet loss rate of the first data packets within a time period T:

$$D(T, 5qi) = \left\lfloor \frac{Ddisc(T, 5qi) * 1000000}{N(T, 5qi)} \right\rfloor \quad (2)$$

In the formula (2), D(T, 5qi) represents the average packet loss rate of first data packets with a same 5QI (the first 5QI) within the time period T, and when a 5QI and a QFI of a QoS flow are the same, the 5QI may also be the QFI; when the first QFI and the first 5QI have different values, the first 5QI is used; Ddisc(T, 5qi) represents a quantity of first data packets that are discarded within the time period T; and N(T, 5qi) represents a quantity of first data packets that arrives at a SAP at the PDCP layer or the SDAP layer.

The CU-UP may detect the packet loss rate of the first data packet based on the foregoing formula (2) at a granularity of a QFI and/or a 5QI, and notify the CU-CP of a detection result.

It should be understood that, the CU-UP detects the packet loss rate of the first data packet based on the foregoing formula (2) at a granularity of a QFI and/or a 5QI; in addition, the CU-UP may further detect the packet loss rate of the first data packet based on another formula or a formula obtained by changing the formula (2). This is not limited in this embodiment of this application.

3. The CU-UP may detect a loss rate that is of the first data packet and exists when uplink and downlink transmission are performed between the CU-UP and the terminal device on a Uu interface, that is, detect uplink and downlink packet loss rates of the first data packet on the Uu interface within a time period T at a granularity of a QFI and/or a 5QI, and notify the CU-CP of a detection result.

4. The CU-UP may detect the scheduled Internet Protocol (scheduled IP) throughput of the first data packet within a time period T, including uplink and downlink throughputs of the first data packet, and may further detect a volume of data bursts of the first data packet within the time period T, where the data bursts are transmitted in a plurality of transmission time intervals; and notify the CU-CP of a detection result.

Optionally, the CU-UP may detect uplink and downlink scheduled IP throughputs that are of the first data packet within the time period T and are related to MDT, that is, detect, at a granularity of a QFI and/or a 5QI, the scheduled IP throughput that is of the first data packet and exists when uplink and downlink transmission are performed on a Uu interface between the CU-UP and the terminal device, or detect, at a granularity of a QFI and/or a 5QI, the scheduled IP throughput that is of the first data packet and exists when uplink and downlink transmission are performed on the F1-U interface between the CU-UP and the DU; and notify the CU-CP of a detection result.

5. The CU-UP may detect a data volume of the first data packet within a time period T, that is, detect uplink and downlink data volumes of the first data packet within the time period T at a granularity of a QFI and/or a 5QI, and notify the CU-CP of a detection result at a granularity of a QFI and/or a 5QI.

6. The CU-UP may detect a delay of the first data packet within a time period T. Specifically, the CU-UP may calculate, at a granularity of a QFI and/or a 5QI, an average delay that is within the time period I and starts from a moment at which the first data packet arrives at a SAP at the PDCP layer until the first data packet is transmitted to the RLC layer, or calculate, at a granularity of a QFI and/or a 5QI, an average delay that is within the time period T and starts from a moment at which the first data packet arrives at a SAP at the SDAP layer until the first data packet is transmitted to the RLC layer; and notify the CU-CP of a calculation result. Whether the access point is located at an upper part of a protocol layer or a lower part of the protocol layer is not limited herein. For example, a reference point of a moment at which the first data packet is successfully received is an upper SAP at the SDAP layer or a lower service access point at the SDAP layer. Alternatively, a reference point of a moment at which the first data packet is successfully received is an upper SAP at the PDCP layer or a lower service access point at the PDCP layer.

It should be understood that, in this embodiment of this application, the CU-UP measures the foregoing transmission performance parameters at a granularity of a QFI and/or a 5QI; in addition, the CU-UP may further measure other transmission performance parameters of the first data packet at a granularity of a QFI and/or a 5QI. This is not limited in this embodiment of this application.

It should be further understood that, in this embodiment of this application, a manner in which the CU-UP reports a measurement result to the CU-CP is not limited, for example, reporting may be performed periodically, or reporting may be triggered by an event, or reporting may be performed based on report configuration configured by the CU-CP. This is not limited in this embodiment of this application.

Optionally, in an embodiment, the report configuration configured by the CU-CP includes a measurement time period T, a measurement event, metrics, one or some QFIs/5QIs/PDU sessions/slices (S-NSSAI), periodic reporting, event-triggered reporting (a period value or a trigger condition, for example, when a metric exceeds a threshold), or the like. This is not limited in this embodiment of this application.

It should be further understood that, in this embodiment of this application, the CU-UP may perform transmission performance measurement and reporting at a granularity of a QFI and/or a 5QI. In addition, the CU-UP may further perform data packet transmission performance measurement and reporting at a granularity of a PDU session, or may further perform transmission performance measurement and reporting at a granularity of a 5QI and a terminal device, or may further perform transmission performance measurement and reporting at a granularity of a PDU session and a network slice. Network slicing is dividing a network into different network slices based on different service requirements and application scenarios, such as a latency and reliability. All network slices are corresponding to different application scenarios and service requirements. One network slice may include a plurality of PDU sessions.

It should be further understood that, in this embodiment of this application, the DU may also perform L2-related parameter measurement based on the measurement configuration information sent by the CU-CP, and send a measurement result to the CU-CP. As shown in FIG. 12, for example, the DL may calculate uplink and downlink physical resource block (PRB) utilization or a quantity of random access preambles that is of a single cell with the time period T, or calculate PRB utilization and a quantity of random access preambles that are only of the DU, instead of performing measurement at a granularity of a cell; and sends a detection result to the CU-CP. Specifically, the DU may notify the CU-CP of the detection result by using related signaling and an F1-C interface between the DU and the CU-CP.

It should be further understood that, in each embodiment of this application, "first", "second", "third", and the like are intended to indicate that a plurality of objects are different. For example, the first information and the second information are only used to indicate information having different content, and impose no impact on the information. The foregoing "first", "second", and the like impose no limitation on the embodiments of this application.

It should be further understood that, in each embodiment of this application, the first information may be carried in any possible signaling for transmission. Likewise, the second information and the third information may also be carried in any possible signaling. In other words, specific forms of the first information, the second information, and the third information are not limited in the embodiments of this application.

It should be further understood that the foregoing descriptions are only intended to help a person skilled in the art better understand the embodiments of this application, instead of limiting the scope of the embodiments of this application. Apparently, a person skilled in the art may make various equivalent modifications or changes based on the examples provided above, or may add some new steps or the like, or combine any two or more of the foregoing embodiments. Such modifications, changes, or combined solutions also fall within the scope of the embodiments of this application.

It should be further understood that sequence numbers of the foregoing processes do not mean an execution sequence. The execution sequence of the processes should be determined based on functions and internal logic of the processes, and impose no limitation on the implementation processes of the embodiments of this application.

It should be further understood that the foregoing descriptions of the embodiments of this application focus on differences between the embodiments. For same or similar parts that are not mentioned, refer to these embodiments. For brevity, details are not described herein again.

The foregoing describes in detail the communication method in the embodiments of this application with reference to FIG. 1 to FIG. 12. The following describes in detail a communications apparatus in the embodiments of this application with reference to FIG. 13 to FIG. 20.

Figure 13:
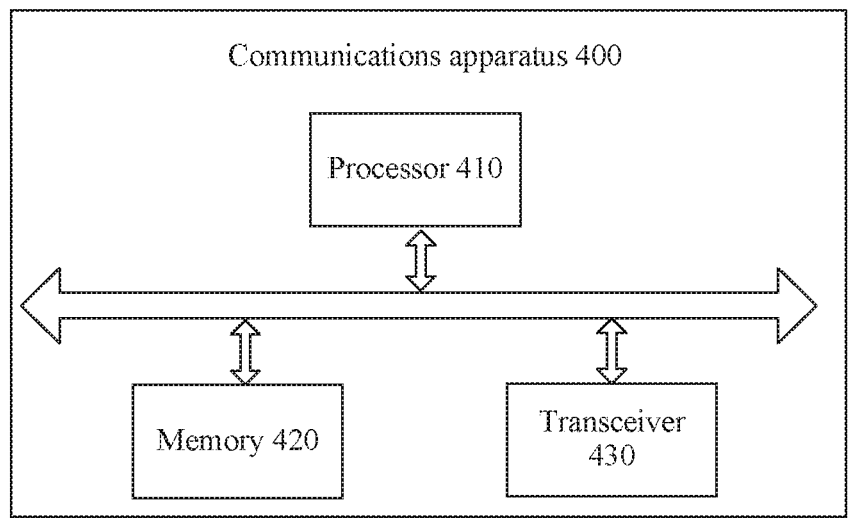
FIG. 13 is a schematic block diagram of a communications apparatus according to an embodiment of this application.

FIG. 13 is a schematic block diagram of a communications apparatus according to an embodiment of this application. It should be understood that the communications apparatus may be the foregoing central unit-user plane node CU-UP. The embodiment of the communications apparatus and the method embodiments are corresponding to each other. For similar descriptions, refer to the method embodiments. The communications apparatus 400 shown in FIG. 13 may be configured to perform steps performed by the CU-UP in each embodiment of the method 200 in FIG. 4, FIG. 6 to FIG. 8B. The communications apparatus 400 includes a processor 410, a memory 420, and a transceiver 430. The processor 410, the memory 420, and the transceiver 430 are connected by using a communications bus. The memory 420 stores an instruction. The processor 410 is configured to execute the instruction stored in the memory 420. The transceiver 430 is configured to perform specific signal sending/receiving under the driving of the processor 410.

The processor 410 is configured to obtain first information, where the first information is used to instruct the CU-UP to map a first data packet to a first data radio bearer DRB and set a reflective mapping indication field of the first data packet, and a quality of service flow QoS flow that the first data packet belongs to is a first QoS flow.

The transceiver 430 is configured to receive the first data packet sent by a core network device.

The processor 410 is further configured to set the reflective mapping indication field of the first data packet.

The transceiver 430 is further configured to send, to a terminal device on the first DRB, the first data packet whose mapping field is set.

According to the communications apparatus provided in this application, when a mapping relationship from the first QoS flow to the first DRB needs to be established in an initial PDU session establishment process, or when the first data packet in the first QoS flow needs to be mapped, for transmission, to a new DRB (the first DRB) upon change of a parameter of the first QoS flow or a load status, the CU-UP obtains the first information, and determines whether reflective mapping from the first QoS flow to the first DRB is required. Optionally, the first information may be pre-stored in the CU-UP. The first information is used to instruct the CU-UP to map the first data packet to the first DRB and set the reflective mapping indication field of the first data packet. The CU-UP determines, based on the first information, whether reflective mapping from the first QoS flow to the first DRB is required. After receiving the first data packet sent by the core network, the CU-UP sets the reflective mapping indication field of the first data packet, and sends, to the terminal device on the first DRB, the first data packet whose reflective mapping indication field is set. The first data packet is a downlink data packet sent by the CU-UP to the terminal device. A purpose of setting the reflective mapping indication field of the first data packet is to indicate to the terminal device whether reflective mapping is required from an uplink data packet in the first QoS flow to the first DRB, that is, whether the terminal device is instructed to send the uplink data packet in the first QoS flow to the CU-UP on the first DRB by using a DU. In this way, in this embodiment of this application, the first QoS flow is mapped to the first DRB in a CU-DU separate scenario, so that the first QoS flow is mapped to a corresponding DRB for both the CU-UP and the terminal device. This ensures that the terminal device and the CU-UP can correctly transmit data, improves communication efficiency and stability, and improves user experience.

The components in the communications apparatus 400 are connected by using the communications bus, that is, the processor 410, the memory 420, and the transceiver 430 communicate with each other by using an inner-connection path, and. transmit a control signal and/or a data signal. The foregoing method embodiments of this application may be applied to the processor, or the processor implements the steps in the foregoing method embodiments. The processor may be an integrated circuit chip and has a signal processing capability. In an implementation process, the steps in the foregoing method embodiments can be implemented by using a hardware integrated logic circuit in the processor, or by using software-form instructions. The processor may be a central processing unit (CPU), a network processor (NP), a combination of a CPU and an NP, a digital signal processor (DSP), an application-specific integrated circuit (ASIC), a field programmable gate array (FPGA) or another programmable logic device, a discrete gate or a transistor logic device, or a discrete hardware component, and may implement or execute the methods, the steps, and logical block diagrams that are disclosed in this application. The general purpose processor may be a microprocessor, or the processor may be any conventional processor or the like. The steps of the methods disclosed in this application may be directly executed and completed by using a hardware decoding processor, or may be executed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware of the processor.

Optionally, in another embodiment of this application, the transceiver 430 is further configured to receive the first information sent by a central unit-control plane node CU-CP.

Optionally, in another embodiment of this application, the processor 410 is configured to set a bit of the reflective mapping indication field of the first data packet to 1.

Optionally, in another embodiment of this application, the processor 410 is configured to set a bit of the reflective mapping indication field of the first data packet to 0.

Optionally, in another embodiment of this application, the first information is information indicating reflective mapping from the first QoS flow to the first DRB.

Optionally, in another embodiment of this application, the transceiver 430 is further configured to: receive a second data packet sent by the terminal device on the first DRB, where a QoS flow that the second data packet belongs to is the first QoS flow. The processor 410 is further configured to set the bit of the reflective mapping indication field of the first data packet to 0 based on the second data packet.

Optionally, in another embodiment of this application, the transceiver 430 is configured to receive a bearer context setup request sent by the CU-CP, where the bearer context setup request includes the first information.

Optionally, in another embodiment of this application, the transceiver 430 is configured to receive a bearer modification request sent by the CU-CP, where the bearer modification request includes the first information.

Optionally, in another embodiment of this application, the transceiver 430 is further configured to send second information to the CU-CP, where the second information is used to indicate that reflective mapping from the first QoS flow to the first DRB is successful.

Figure 14:
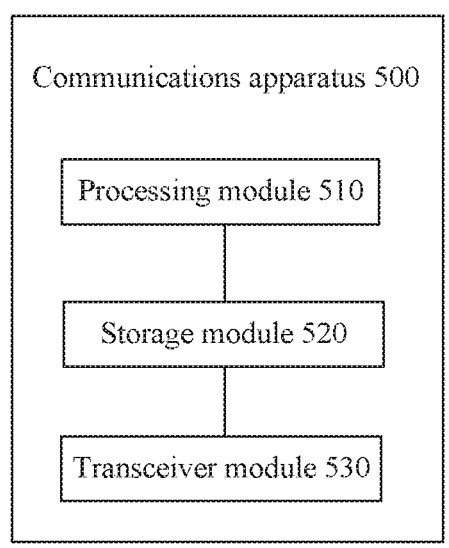
FIG. 14 is a schematic block diagram of a communications apparatus according to another embodiment of this application.

It should be noted that, in this embodiment of this application, the processor 410 may be implemented by a processing module, the memory 420 may be implemented by a storage module, and the transceiver 430 may be implemented by a transceiver module. As shown in FIG. 14, a communications apparatus 500 may include a processing module 510, a storage module 520, and a transceiver module 530.

The communications apparatus 400 shown in FIG. 13 or the communications apparatus 500 shown in FIG. 14 can implement the steps performed by the CU-UP in each embodiment of the method 200 in FIG. 4, FIG. 6 to FIG. 8B. For similar descriptions, refer to descriptions of the method. To avoid repetition, details are not described herein again.

Figure 15:
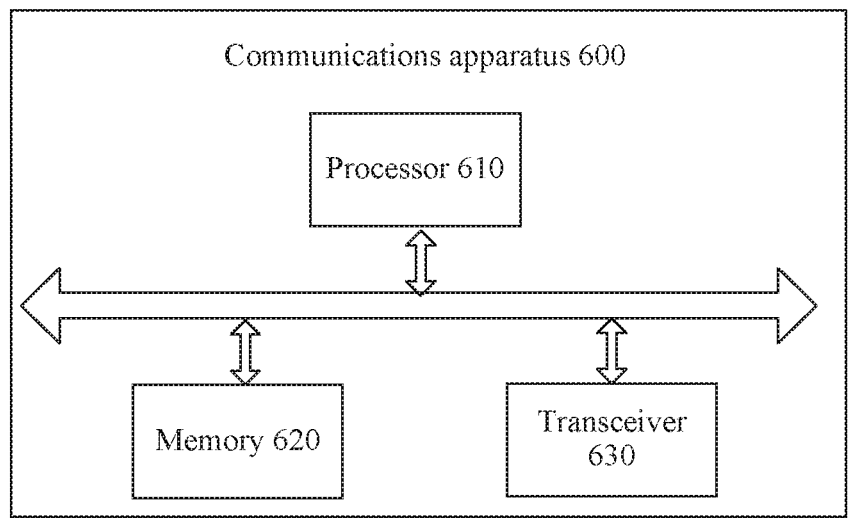
FIG. 15 is a schematic block diagram of a communications apparatus according to an embodiment of this application.

FIG. 15 is a schematic block diagram of a communications apparatus 600 according to an embodiment of this application. It should be understood that the embodiment of the communications apparatus and the method embodiments are corresponding to each other. For similar descriptions, refer to the method embodiments. The communications apparatus 600 shown in FIG. 15 may be configured to perform steps performed by the CU-CP in each embodiment of the method 200 in FIG. 4, FIG. 6 to FIG. 8B. As shown in FIG. 15, the communications apparatus 600 includes a processor 610, a memory 620, and a transceiver 630. The processor 610, the memory 620. and the transceiver 630 are connected by using a communications bus. The memory 620 stores an instruction. The processor 610 is configured to execute the instruction stored in the memory 620. The transceiver 630 is configured to perform specific signal sending/receiving under the driving of the processor 610.

The processor 610 is configured to generate first information, where the first information is used to instruct a central unit-user plane node CU-UP to map a first data packet to a first data radio bearer DRB and set a reflective mapping indication field of the first data packet, and a quality of service flow QoS flow that the first data packet belongs to is a first QoS flow.

The transceiver 630 is configured to send the first information to the CU-UP.

According to the communications apparatus provided in this application, in a CU-DU separate base station architecture, when the CU-CP requires execution of mapping from the first QoS flow to the first DRB, the CU-CP sends the first information to the CU-UP. The first information is used to instruct the CU-UP to map data of the first data packet to the first DRB and set the reflective mapping indication field of the first data packet. After setting, based on the first information, the reflective mapping indication field of the first data packet received from a core network, the CU-UP sends, to a terminal device on the first DRB, the first data packet whose reflective mapping indication field is set. In this way, the first QoS flow is mapped to the first DRB in a CU-DU separate scenario, so that QoS flow to DRB mapping is implemented for both the CU-UP and the terminal device. This ensures that the terminal device and the CU-UP can correctly transmit data, improves communication efficiency and stability, and improves user experience.

The components in the communications apparatus 600 are connected by using the communications bus, that is, the processor 610, the memory 620, and the transceiver 630 communicate with each other by using an inner connection path, and transmit a control signal and/or a data signal. The foregoing method embodiments of this application may be applied to the processor, or the processor implements the steps in the foregoing method embodiments. The processor may be an integrated circuit chip and has a signal processing capability. In an implementation process, the steps in the foregoing method embodiments can be implemented by using a hardware integrated logic circuit in the processor, or by using software-form instructions, The processor may be a CPU, a network processor NP, a combination of a CPU and an NP, a DSP, an ASIC, an FPGA or another programmable logic device, a discrete gate or a transistor logic device, or a discrete hardware component, and may implement or execute the methods, the steps, and logical block diagrams that are disclosed in this application. The general purpose processor may be a microprocessor, or the processor may be any conventional processor or the like. The steps of the methods disclosed in this application may be directly executed and completed by using a hardware decoding processor, or may be executed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware of the processor.

Optionally, in another embodiment of this application, the first information is information indicating reflective mapping from the first QoS flow to the first DRB.

Optionally, in another embodiment of this application, the transceiver 630 is configured to send a bearer context setup request to the CU-UP, where the bearer context setup request includes the first information.

Optionally, in another embodiment of this application, the transceiver 630 is configured to send a bearer modification request to the CU-UP where the bearer modification request includes the first information.

Optionally, in another embodiment of this application, the transceiver 630 is further configured to receive second information sent by the CU-UP, where the second information is used to indicate that reflective mapping from the first QoS flow to the first DRB is successful.

Figure 16:
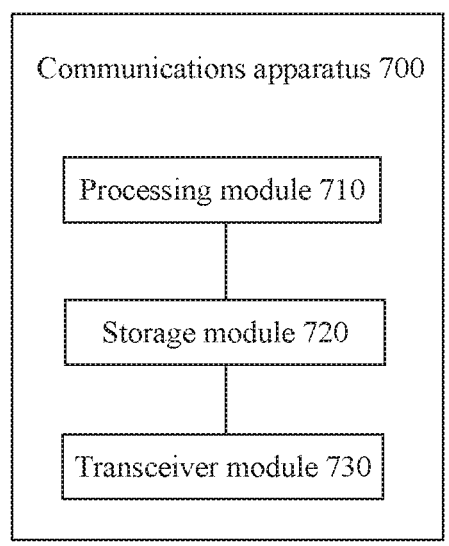
FIG. 16 is a schematic block diagram of a communications apparatus according to another embodiment of this application.

It should be noted that, in this embodiment of the present invention, the processor 610 may be implemented by a processing module, the memory 620 may be implemented by a storage module, and the transceiver 630 may be implemented by a transceiver module. As shown in FIG. 16, a communications apparatus 700 may include a processing module 710, a storage module 720, and a transceiver module 730.

The communications apparatus 600 shown in FIG. 15 or the communications apparatus 700 shown in FIG. 16 can implement the steps performed by the CU-CP in each embodiment of the method 200 in FIG. 4, FIG. 6 to FIG. 8B. For similar descriptions, refer to descriptions of the method. To avoid repetition, details are not described herein again.

Figure 17:
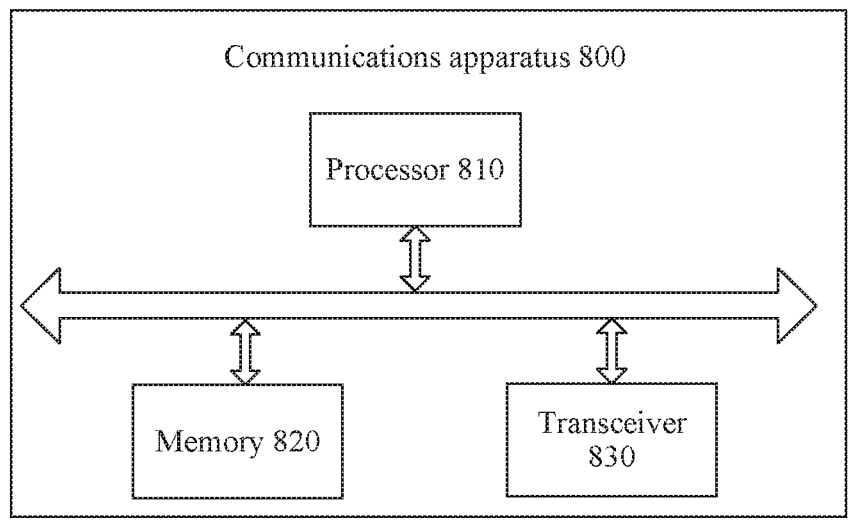
FIG. 17 is a schematic block diagram of a communications apparatus according to an embodiment of this application.

FIG. 17 is a schematic block diagram of a communications apparatus 800 according to an embodiment of this application. It should be understood that the embodiment of the communications apparatus and the method embodiments are corresponding to each other. For similar descriptions, refer to the method embodiments. The communications apparatus 800 shown in FIG. 17 may be configured to perform steps performed by the CU-UP in FIG. 9 to FIG. 12 and each embodiment of the method 300. For similar descriptions, refer to descriptions of the method. To avoid repetition, details are not described herein again. As shown in FIG. 17, the communications apparatus 800 includes a processor 810, a memory 820, and a transceiver 830. The processor 810, the memory 820, and the transceiver 830 are connected by using a communications bus. The memory 820 stores an instruction. The processor 810 is configured to execute the instruction stored in the memory 820. The transceiver 830 is configured to perform specific signal sending/receiving under the driving of the processor 810.

The transceiver 830 is configured to receive third information sent by a central unit-control plane node CU-CP, where the third information is used to instruct the CU-UP to detect transmission performance of a first data packet, and the first data packet is identified by a first quality of service flow identifier QFI or a first 5G quality of service identifier 5QI.

The processor 810 is configured to detect the transmission performance of the first data packet based on the third information.

According to the communications apparatus provided in this application, in a CU-DU separate base station architecture, when the CU-CP requires detection of performance of a first QoS flow in a PDU session of a terminal device, the CU-CP sends the third information to the CU-UP. The third information is used to instruct the CU-UP to detect the transmission performance of the first data packet (a data packet belonging to the first QoS flow), and the first data packet is identified by the first quality of service flow identifier QFI or the first 5G quality of service identifier 5QI. The CU-UP detects the transmission performance of the first data packet based on the third information. In this way, transmission parameters are measured at a granularity of a 5QI or a QFI in the CU-DU separate base station architecture, so that normal running of a network system can be ensured, and user experience can be improved.

The components in the communications apparatus 800 are connected by using the communications bus, that is, the processor 810, the memory 820, and the transceiver 830 communicate with each other by using an inner connection path, and transmit a control signal and/or a data signal. The foregoing method embodiments of this application may be applied to the processor, or the processor implements the steps in the foregoing method embodiments. The processor may be an integrated circuit chip and has a signal processing capability. In an implementation process, the steps in the foregoing method embodiments can be implemented by using a hardware integrated logic circuit in the processor, or by using software-form instructions. The processor may be a CPU, a network processor NP, a combination of a CPU and an NP, a DSP, an ASIC, an FPGA or another programmable logic device, a discrete gate or a transistor logic device, or a discrete hardware component, and may implement or execute the methods, the steps, and logical block diagrams that are disclosed in this application. The general purpose processor may be a microprocessor, or the processor may be any conventional processor or the like. The steps of the methods disclosed in this application may be directly executed and completed by using a hardware decoding processor, or may be executed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware of the processor.

Optionally, in another embodiment of this application, the transceiver 830 is further configured to send fourth information to the CU-CP, where the fourth information is used to indicate whether the transmission performance of the first data packet fulfills a transmission performance indicator, the transmission performance indicator is configured in the first data packet, and the third information includes the transmission performance indicator.

Optionally, in another embodiment of this application, the transceiver 830 is configured to send notification information to the CU-CP, where the notification information includes the fourth information.

Optionally, in another embodiment of this application, the transceiver 830 is configured to send a bearer modification request to the CU-CP, where the bearer modification request includes the fourth information.

Optionally, in another embodiment of this application, the transmission performance indicator of the first data packet includes at least one of a delay budget of the first data packet, a packet loss rate of the first data packet, an uplink guaranteed bit rate GBR, a downlink GBR, a maximum uplink GBR, or a maximum downlink GBR.

Optionally, in another embodiment of this application, the third information includes measurement configuration information, where the measurement configuration information includes a transmission performance parameter and/or a measurement time length of the first data packet. The transceiver 830 is further configured to send fifth information to the CU-CP, where the fifth information includes a detection result of the transmission performance of the first data packet.

Optionally, in another embodiment of this application, the transmission performance parameter includes at least one of a packet loss rate of the first data packet, a downlink transmission delay of the first data packet, a scheduled Internet Protocol throughput of the first data packet, or a data volume of the first data packet.

Figure 18:
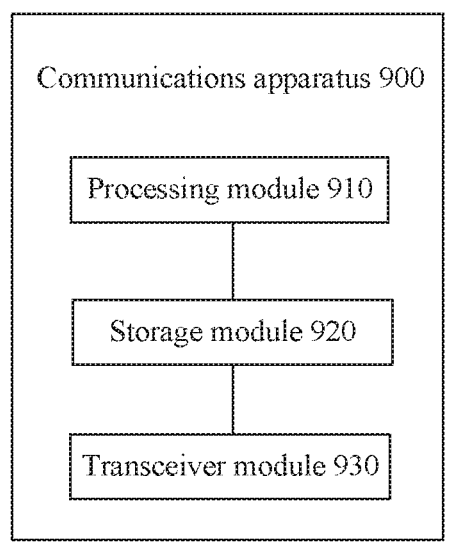
FIG. 18 is a schematic block diagram of a communications apparatus according to another embodiment of this application.

It should be noted that, in this embodiment of the present invention, the processor 810 may be implemented by a processing module, the memory 820 may be implemented by a storage module, and the transceiver 830 may be implemented by a transceiver module. As shown in FIG. 18, a communications apparatus 900 may include a processing module 910, a storage module 920, and a transceiver module 930.

The communications apparatus 800 shown in FIG. 17 or the communications apparatus 900 shown in FIG. 18 can implement the steps performed by the CU-UP in FIG. 9 to FIG. 12 and each embodiment of the method 300. For similar descriptions, refer to descriptions of the method. To avoid repetition, details are not described herein again.

Figure 19:
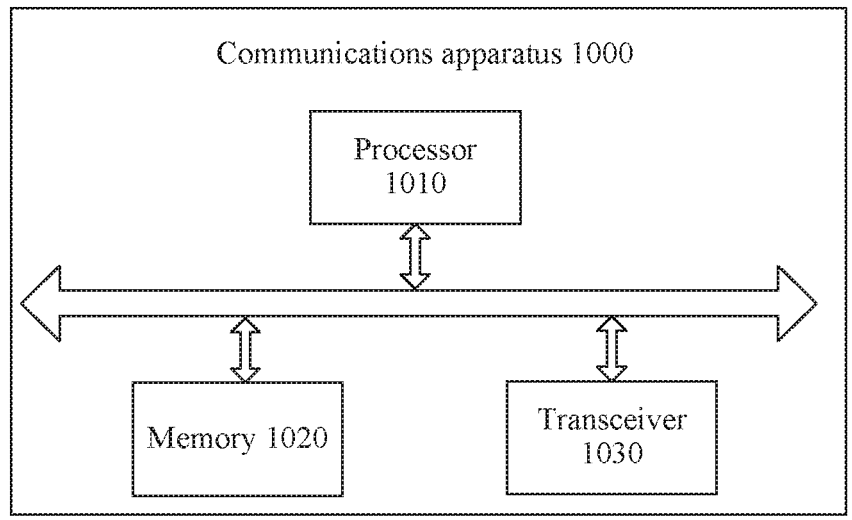
FIG. 19 is a schematic block diagram of a communications apparatus according to an embodiment of this application.

FIG. 19 is a schematic block diagram of a communications apparatus 1000 according to an embodiment of this application. It should be understood that the embodiment of the communications apparatus and the method embodiments are corresponding to each other. For similar descriptions, refer to the method embodiments. The communications apparatus 1000 shown in FIG. 19 may be configured to perform steps performed by the CU-CP in FIG. 9 to FIG. 12 and each embodiment of the method 300. For similar descriptions, refer to descriptions of the method. To avoid repetition, details are not described herein again. As shown in FIG. 19, the communications apparatus 1000 includes a processor 1010, a memory 1020, and a transceiver 1030. The processor 1010, the memory 1020, and the transceiver 1030 are connected by using a communications bus. The memory 1020 stores an instruction. The processor 1010 is configured to execute the instruction stored in the memory 1020. The transceiver 1030 is configured to perform specific signal sending/receiving under the driving of the processor 1010.

The processor 1010 is configured to generate third information, where the third information is used to instruct a central unit-user plane node CU-UP to detect transmission performance of a first data packet, and the first data packet is identified by a first quality of service flow identifier QFI or a first 5G quality of service identifier 5QI.

The transceiver 1030 is configured to send the third information to the CU-UP.

According to the communications apparatus provided in this application, in a CU-DU separate base station architecture, when the CU-CP requires detection of performance of a first QoS flow in a PDU session of a terminal device, the CU-CP sends the third information to the CU-UP. The third information is used to instruct the CU-UP to detect the transmission performance of the first data packet (a data packet belonging to the first QoS flow), and the first data packet is identified by the first quality of service flow identifier QFI or the first 5G quality of service identifier 5QI. The CU-UP detects the transmission performance of the first data packet based on the third information. In this way, transmission parameters are measured at a granularity of a 5QI or a QFI in the CU-DU separate base station architecture, so that normal running of a network system can be ensured, and user experience can be improved.

The components in the communications apparatus 1000 are connected by using the communications bus, that is, the processor 1010, the memory 1020, and the transceiver 1030 communicate with each other by using an inner connection path, and transmit a control signal and/or a data signal. The foregoing method embodiments of this application may be applied to the processor, or the processor implements the steps in the foregoing method embodiments. The processor may be an integrated circuit chip and has a signal processing capability. In an implementation process, the steps in the foregoing method embodiments can be implemented by using a hardware integrated logic circuit in the processor, or by using software-form instructions. The processor may be a CPU, a network processor NP, a combination of a CPU and an NP, a DSP, an ASIC, an FPGA or another programmable logic device, a discrete gate or a transistor logic device, or a discrete hardware component, and may implement or execute the methods, the steps, and logical block diagrams that are disclosed in this application. The general purpose processor may be a microprocessor, or the processor may be any conventional processor or the like. The steps of the methods disclosed in this application may be directly executed and completed by using a hardware decoding processor, or may be executed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware of the processor.

Optionally, in another embodiment of this application, the transceiver 1030 is further configured to receive fourth information sent by the CU-UP, where the fourth information is used to indicate whether the transmission performance of the first data packet fulfills a transmission performance indicator, the transmission performance indicator is configured in the first data packet, and the third information includes the transmission performance indicator.

Optionally, in another embodiment of this application, the transceiver 1030 is configured to receive notification information sent by the CU-UP, where the notification information includes the fourth information.

Optionally, in another embodiment of this application, the transceiver 1030 is configured to receive a bearer modification request sent by the CU-UP, where the bearer modification request includes the fourth information.

Optionally, in another embodiment of this application, the transmission performance indicator of the first data packet includes at least one of a delay budget of the first data packet, a packet loss rate of the first data packet, an uplink guaranteed bit rate GBR, a downlink GBR, a maximum uplink GBR, or a maximum downlink GBR.

Optionally, in another embodiment of this application, the third information includes measurement configuration information, where the measurement configuration information includes a transmission performance parameter and/or a measurement time length of the first data packet. The transceiver 1030 is further configured to receive fifth information sent by the CU-UP, where the fifth information includes a detection result of the transmission performance of the first data packet.

Optionally, in another embodiment of this application, the transmission performance parameter includes at least one of a packet loss rate of the first data packet, a downlink transmission delay of the first data packet, a scheduled Internet Protocol throughput of the first data packet, or a data volume of the first data packet.

Figure 20:
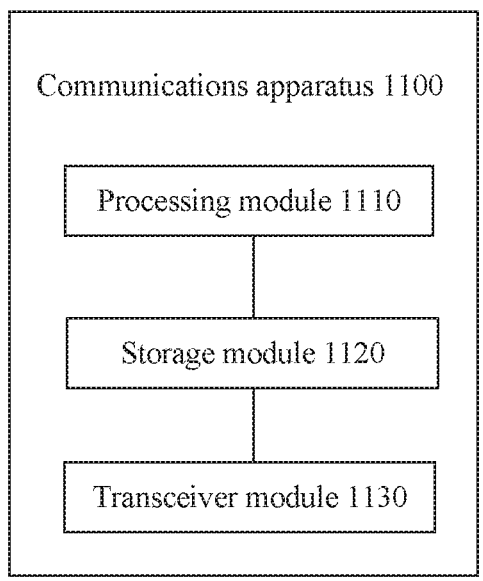
FIG. 20 is a schematic block diagram of a communications apparatus according to another embodiment of this application.

It should be noted that, in this embodiment of the present invention, the processor 1010 may be implemented by a processing module, the memory 1020 may be implemented by a storage module, and the transceiver 1030 may be implemented by a transceiver module. As shown in FIG. 20, a communications apparatus 1100 may include a processing module 1110, a storage module 1120, and a transceiver module 1130.

The communications apparatus 1000 shown in FIG. 19 or the communications apparatus 1100 shown in FIG. 20 can implement the steps performed by the CU-CP in FIG. 9 to FIG. 12 and each embodiment of the method 300. For similar descriptions, refer to descriptions of the method. To avoid repetition, details are not described herein again.

An embodiment of this application further provides a computer readable medium, configured to store computer program code, where the computer program includes an instruction used to execute the communication method in the embodiments of this application. The readable medium may be a read-only memory (ROM) or a random access memory (RAM). This is not limited in this embodiment of this application.

An embodiment of this application further provides a communications system. The communications system includes the communications apparatus provided in the foregoing embodiments of this application, and the communications system may complete any communication method provided in the embodiments of this application. In this way, a first QoS flow can be mapped to a first DRB and L2 parameter measurement can be supported in a CU-DU separate base station architecture. Therefore, successful and normal transmission of user data can be ensured, network stability is improved, quality of network operation is improved, and user experience is improved. It should be understood that the communications system may further include another communications device, for example, a terminal device, an access network device, or a DU. This is not limited in this embodiment of this application.

An embodiment of this application further provides a system chip. The system chip includes a processing unit and a communications unit. The processing unit may be, for example, a processor. The communications unit may be, for example, an input/output interface, a pin, or a circuit. The processing unit may execute a computer instruction, so that the chip in the terminal executes the communication method in any one of the embodiments of this application.

Optionally, the computer instruction is stored in a storage unit.

Optionally, the storage unit is a storage unit in the chip, such as a register or a cache. Alternatively, the storage unit may be a storage unit that is in the terminal and that is outside the chip, for example, a ROM, another type of static storage device that can store static information and instructions, or a RAM. The processor mentioned anywhere may be a CPU, a microprocessor, an ASIC, or one or more integrated circuits for controlling program execution of the foregoing power control method.

This application further provides a computer program product. The computer program product includes an instruction. When the instruction is executed, a CU-CP, a CU-UP, and a DU execute operations corresponding to the CU-CP, the CU-UP, and the DU in the foregoing method.

It should be understood that the foregoing descriptions of the embodiments of this application focus on differences between the embodiments. For same or similar parts that are not mentioned, refer to these embodiments. For brevity, details are not described herein again.

It should be understood that the term such as "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are only examples. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses, or units, and may be implemented in electronic, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a central unit-user plane node (CU-UP) and from a central unit-control plane node (CU-CP), first information that instructs the CU-UP to:
map a first data packet to a data radio bearer (DRB), and
set a reflective quality of service (QoS) flow to DRB mapping indication (RDI) field of the first data packet, wherein the first data packet belongs to a QoS flow, and wherein the RDI field instructs a terminal device to map an uplink data packet in the QoS flow to the DRB;
receiving, by the CU-UP, the first data packet sent by a core network device;
setting, by the CU-UP based on the first information, a bit of the RDI field of the first data packet to indicate whether a mapping from the QoS flow to the DRB needs to be updated, wherein:
setting the bit to 1 indicates that the mapping needs to be updated by storing a rule of reflective mapping of the uplink data packet to the DRB and mapping the uplink data packet to the DRB; and
setting the bit to 0 indicates that the mapping does not need to be updated and a reflective mapping is not indicated; and
sending, by the CU-UP to the terminal device on the DRB through a distributed unit (DU), the first data packet, wherein the first data packet comprises the RDI field and a reflective QoS indication (RQI) field.

2. The method according to claim 1, wherein the first information further indicates to perform reflective mapping from the QoS flow to the DRB.

3. The method according to claim 1, wherein receiving the first information comprises:
receiving, by the CU-UP, a bearer context setup request that comprises the first information.

4. The method according to claim 1, wherein receiving the first information comprises:
receiving, by the CU-UP, a bearer modification request that comprises the first information.

5. The method according to claim 1, wherein the first data packet is a first downlink data packet, and the method further comprises:
after setting the bit to 1, receiving, by the CU-UP, a second data packet sent by the terminal device on the DRB, wherein the second data packet belongs to the QoS flow;
receiving, by the CU-UP, a second downlink data packet sent by the core network device; and
setting, by the CU-UP, a bit of a reflective mapping indication field of the second downlink data packet to 0 that indicates no action.

6. The method according to claim 5, wherein the method further comprises:
sending, by the CU-UP to the CU-CP, second information indicating that reflective mapping from the QoS flow to the DRB is successful.

7. A communication method, comprising:
generating, by a central unit-control plane node (CU-CP), first information that instructs a central unit-user plane node (CU-UP) to:
map a first data packet to a data radio bearer (DRB), and
set a reflective quality of service (QoS) flow to DRB mapping indication (RDI) field of the first data packet, wherein the first data packet belongs to a QoS flow, and wherein the RDI field instructs a terminal device to map an uplink data packet in the QoS flow to the DRB; and
sending, by the CU-CP, the first information to the CU-UP for the CU-UP to:
set, based on the first information, a bit of the RDI field of the first data packet to indicate whether a mapping from the QoS flow to the DRB needs to be updated, wherein:
setting the bit to 1 indicates that the mapping needs to be updated by storing a rule of reflective mapping of the uplink data packet to the DRB and mapping the uplink data packet to the DRB; and
setting the bit to 0 indicates that the mapping does not need to be updated and a reflective mapping is not indicated; and
send, to the terminal device on the DRB through a distributed unit (DU), the first data packet, wherein the first data packet comprises the RDI field and a reflective QoS indication (RQI) field.

8. The method according to claim 7, wherein the first information is information indicating reflective mapping from the QoS flow to the DRB.

9. The method according to claim 7, wherein sending the first information to the CU-UP comprises:
sending a bearer context setup request to the CU-UP, wherein the bearer context setup request comprises the first information.

10. The method according to claim 7, wherein sending the first information to the CU-UP comprises:
sending a bearer modification request to the CU-UP, wherein the bearer modification request comprises the first information.

11. The method according to claim 7, wherein the method further comprises:
receiving, by the CU-CP, second information sent by the CU-UP, wherein the second information indicates that reflective mapping from the QoS flow to the DRB is successful.

12. A communications apparatus comprising a central unit-user plane (CU-UP), the CU-UP comprises at least one processor, a transceiver, and a memory coupled to the at least one processor and storing programming instructions for execution by the at least one processor, wherein the programming instructions, when executed, instruct the at least one processor to:
receive first information from a central unit-control plane (CU-CP), wherein the first information instructs the CU-UP to map a first data packet to:
map a first data packet to a data radio bearer (DRB), and
set a reflective quality of service (QoS) flow to DRB mapping indication (RDI) field of the first data packet, wherein the first data packet belongs to a QoS flow, and wherein the RDI field instructs a terminal device to map an uplink data packet in the QoS flow to the DRB;

receive, through the transceiver, the first data packet sent by a core network device;

set, based on the first information, a bit of the RDI field of the first data packet to indicate whether a mapping from the QoS flow to the DRB needs to be updated, wherein:
setting the bit to 1 indicates that the mapping needs to be updated by storing a rule of reflective mapping of the uplink data packet to the DRB and mapping the uplink data packet to the DRB; and
setting the bit to 0 indicates that the mapping does not need to be updated and a reflective mapping is not indicated; and send, through the transceiver to the terminal device on the DRB and through a distributed unit (DU), the first data packet, wherein the first data packet comprises the RDI field and a reflective QoS indication (RQI) field.

13. The communications apparatus according to claim 12, wherein
the first information is information indicating reflective mapping from the QoS flow to the DRB.

14. The communications apparatus according to claim 12, wherein the programming instructions, when executed, further instruct the at least one processor to:
receive, through the transceiver, a bearer context setup request sent by the CU-CP, wherein the bearer context setup request comprises the first information.

15. The communications apparatus according to claim 12, wherein the programming instructions, when executed, further instruct the at least one processor to:
receive, through the transceiver, a bearer modification request sent by the CU-CP, wherein the bearer modification request comprises the first information.

16. The communications apparatus according to claim 12, wherein the first data packet is a first downlink data packet, and the programming instructions, when executed, further instruct the at least one processor to:
after setting the bit to 1, receive, through the transceiver, a second data packet sent by the terminal device on the DRB, wherein the second data packet belongs to the QoS flow;
receive, through the transceiver, a second downlink data packet sent by the core network device; and
set a bit of a reflective mapping indication field of the second downlink data packet to 0 that indicates no action.

17. The communications apparatus according to claim 16, wherein the programming instructions, when executed, further instruct the at least one processor to:
send, through the transceiver, second information to a central unit-control plane (CU-CP), wherein the second information indicates that reflective mapping from the QoS flow to the DRB is successful.

18. A communications apparatus comprising a central unit-control plane (CU-CP), the CU-CP comprises at least one processor, a transceiver, and a memory coupled to the at least one processor and storing programming instructions for execution by the at least one processor, wherein the programming instructions, when executed, instruct the at least one processor to:
generate first information that instructs a central unit-user plane node (CU-UP) to:
map a first data packet to a data radio bearer (DRB), and
set a reflective quality of service (QoS) flow to DRB mapping indication (RDI) field of the first data packet, wherein the first data packet belongs to a QoS flow, and wherein the RDI field instructs a terminal device to map an uplink data packet in the QoS flow to the DRB; and
send the first information to the CU-UP for the CU-UP to:
set, based on the first information, a bit of the RDI field of the first data packet to indicate whether a mapping from the QoS flow to the DRB needs to be updated, wherein:
setting the bit to 1 indicates that the mapping needs to be updated by storing a rule of reflective mapping of the uplink data packet to the DRB and mapping the uplink data packet to the DRB; and
setting the bit to 0 indicates that the mapping does not need to be updated and a reflective mapping is not indicated; and
send, through the transceiver to the terminal device on the DRB and through a distributed unit (DU), the first data packet, wherein the first data packet comprises the RDI field and a reflective QoS indication (RQI) field.

19. The communications apparatus according to claim 18, wherein the first information is information indicating reflective mapping from the QoS flow to the DRB.

20. The communications apparatus according to claim 18, wherein the programming instructions, when executed, further instruct the at least one processor to:
send, through the transceiver, a bearer context setup request to the CU-UP, wherein the bearer context setup request comprises the first information.

21. The communications apparatus according to claim 18, wherein the programming instructions, when executed, further instruct the at least one processor to:
send, through the transceiver, a bearer modification request to the CU-UP, wherein the bearer modification request comprises the first information.

22. The communications apparatus according to claim 18, wherein the programming instructions, when executed, further instruct the at least one processor to:
receive, through the transceiver, second information sent by the CU-UP, wherein the second information indicates that reflective mapping from the QoS flow to the DRB is successful.

23. The communication method according to claim 1, wherein the method further comprises:
receiving, by the CU-UP, a second downlink data packet sent by the core network device;
determining, by the CU-UP, a mapping rule from the QoS flow to the DRB is unchanged; and
setting, by the CU-UP, a reflective mapping indication field of the second downlink data packet to 0 that indicates no action.

24. The communication method according to claim 3, wherein the bearer context setup request is configured to request the CU-UP to establish a bearer associated with a PDU session between the CU-UP and the terminal device.

25. The communication apparatus according to claim 12, wherein the programming instructions further instruct the at least one processor to:
receive, through the transceiver, a second downlink data packet sent by the core network device;
determine a mapping rule from the QoS flow to the DRB is unchanged; and
set a reflective mapping indication field of the second downlink data packet to 0 that indicates no action.

26. The communication apparatus according to claim 14, wherein the bearer context setup request is configured to request the CU-UP to establish a bearer associated with a PDU session between the CU-UP and the terminal device.

\* \* \* \* \*

UNITED STATES PATENT AND TRADEMARK OFFICE
CERTIFICATE OF CORRECTION

| | |
|---|---|
| PATENT NO. | : 11,665,577 B2 |
| APPLICATION NO. | : 17/039489 |
| DATED | : May 30, 2023 |
| INVENTOR(S) | : Feng Han et al. |

It is certified that error appears in the above-identified patent and that said Letters Patent is hereby corrected as shown below:

On the Title Page

Item [71], before "Guangdong" insert -- Shenzhen --.

Signed and Sealed this
Sixteenth Day of January, 2024

Katherine Kelly Vidal
*Director of the United States Patent and Trademark Office*